(12) United States Patent
Larraia

(10) Patent No.: US 12,664,251 B2
(45) Date of Patent: Jun. 23, 2026

(54) STATEMENT PROOF AND VERIFICATION

(71) Applicant: nChain Licensing AG, Zug (CH)

(72) Inventor: Enrique Larraia, London (GB)

(73) Assignee: nChain Licensing AG, Zug (CH)

( * ) Notice: Subject to any disclaimer, the term of this patent is extended or adjusted under 35 U.S.C. 154(b) by 0 days.

(21) Appl. No.: 18/854,418

(22) PCT Filed: Mar. 30, 2023

(86) PCT No.: PCT/EP2023/058236
§ 371 (c)(1),
(2) Date: Oct. 4, 2024

(87) PCT Pub. No.: WO2023/194187
PCT Pub. Date: Oct. 12, 2023

(65) Prior Publication Data
US 2025/0342239 A1 Nov. 6, 2025

(30) Foreign Application Priority Data
Apr. 8, 2022 (GB) ...................................... 2205183

(51) Int. Cl.
G06F 21/44 (2013.01)

(52) U.S. Cl.
CPC ...... G06F 21/44 (2013.01); G06F 2221/2103 (2013.01)

(58) Field of Classification Search
CPC ............. G06F 21/44; G06F 2221/2103; H04L 9/3218; H04L 9/50
USPC ............................................................ 726/4
See application file for complete search history.

(56) References Cited

U.S. PATENT DOCUMENTS

| | | | |
|---|---|---|---|
| 8,654,974 B2 | 2/2014 | Anderson et al. | |
| 10,491,390 B2 * | 11/2019 | Gurkan | H04L 9/0643 |
| 10,846,372 B1 * | 11/2020 | Jayachandran | H04L 9/3239 |
| 11,310,060 B1 * | 4/2022 | Poelstra | H04L 9/3066 |
| 11,394,550 B2 * | 7/2022 | Youssef | H04L 9/3218 |
| 2015/0207630 A1 | 7/2015 | Shimoyama et al. | |

(Continued)

OTHER PUBLICATIONS

GB2205173.4 Combined Search and Examination Report dated Sep. 30, 2022, 7 pages.

(Continued)

*Primary Examiner* — Dereena T Cattungal
(74) *Attorney, Agent, or Firm* — Galvani Smith PLLC

(57) ABSTRACT

A method of providing proof that a statement is true keeping a secret input to the statement a secret, comprising: generating a proof using a public input, the secret input, and a proving key linked to an augmented verification circuit which comprises (i) a verification circuit arranged to receive the inputs, supply the secret input to a function circuit representing the statement to generate a function circuit output, and determine whether the public input corresponds to the function circuit output; and (ii) a multiplicative gate arranged to receive the secret input and a dummy value. The proof comprises a commitment to inputs of multiplicative gates of the augmented verification circuit, the commitment generated using a first vector comprising n components from a finite group of data elements. The secret input is a discrete logarithm of a public element of said finite group. The proof is transmitted to a verifying device.

18 Claims, 7 Drawing Sheets

(56)          References Cited

U.S. PATENT DOCUMENTS

| | | | |
|---|---|---|---|
| 2017/0279611 A1* | 9/2017 | Kraemer | G06Q 20/065 |
| 2017/0317834 A1* | 11/2017 | Smith | H04L 9/3239 |
| 2019/0295182 A1* | 9/2019 | Kfir | H04L 9/3239 |
| 2021/0028939 A1 | 1/2021 | Trevethan et al. | |
| 2021/0226795 A1* | 7/2021 | Covaci | H04L 63/04 |
| 2022/0075879 A1 | 3/2022 | Hamburg et al. | |
| 2022/0085984 A1 | 3/2022 | Khandani | |
| 2023/0071022 A1 | 3/2023 | Hong et al. | |
| 2023/0254115 A1 | 8/2023 | Hamburg et al. | |
| 2023/0401033 A1 | 12/2023 | Ikarashi | |
| 2025/0117217 A1 | 4/2025 | Heinecke et al. | |

OTHER PUBLICATIONS

GB2205183.3 Combined Search and Examination Report dated Sep. 21, 2022, 5 pages.
PCT/EP2023/058236 International Search Report and Written Opinion dated Jul. 10, 2023, 10 pages.
PCT/EP2023/058242 International Search Report and Written Opinion dated Jul. 13, 2023, 10 pages.

* cited by examiner

Figure 2

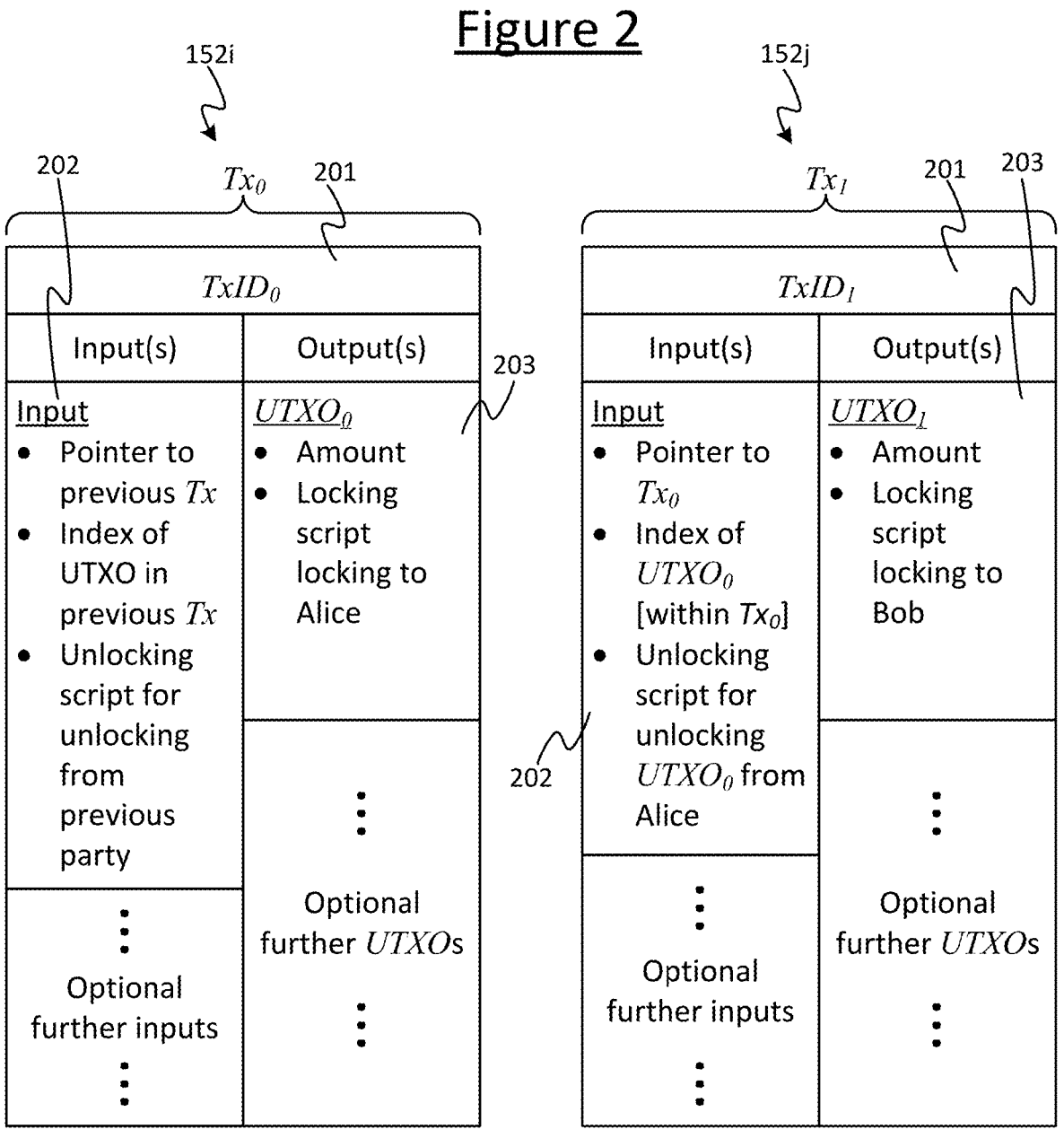

152i

202    $Tx_0$    201

| TxID$_0$ | |
|---|---|
| Input(s) | Output(s) |
| Input<br>• Pointer to previous $Tx$<br>• Index of UTXO in previous $Tx$<br>• Unlocking script for unlocking from previous party<br><br>⋮<br><br>Optional further inputs<br>⋮ | UTXO$_0$<br>• Amount<br>• Locking script locking to Alice<br><br>⋮<br><br>Optional further UTXOs<br>⋮ |

203

152j $Tx_1$    201    203

| TxID$_1$ | |
|---|---|
| Input(s) | Output(s) |
| Input<br>• Pointer to $Tx_0$<br>• Index of UTXO$_0$ [within $Tx_0$]<br>• Unlocking script for unlocking UTXO$_0$ from Alice<br><br>⋮<br><br>Optional further inputs<br>⋮ | UTXO$_1$<br>• Amount<br>• Locking script locking to Bob<br><br>⋮<br><br>Optional further UTXOs<br>⋮ |

202

Transaction
from Alice to Bob

Validated by running: Locking script from output 203 of $Tx_0$, together with Alice's unlocking script from input 202 of $Tx_1$. This checks that Alice's unlocking script in $Tx_1$ meets the condition(s) defined in the locking script of

600

700

800

S802

Generate a commitment U

S804

Commitment U

Generate a random challenge

S806 random challenge

S808

Generate a response to the random challenge

S810

S812 response

Process the response

S814

STATEMENT PROOF AND VERIFICATION

CROSS REFERENCE TO RELATED APPLICATIONS

This application is the U.S. National Stage of International Application No. PCT/EP2023/058236 filed on Mar. 30, 2023, which claims the benefit of United Kingdom Patent Application No. 2205183.3, filed on Apr. 8, 2022, the contents of which are all incorporated herein by reference in their entireties.

TECHNICAL FIELD

The present disclosure relates to statement proof and verification. In particular, an embodiment relates to proving (and verifying) that a statement is true while keeping a secret input to the statement a secret. Embodiments extend to proving (and verifying) that a secret that is committed in a batched commitment is a discrete logarithm of a public element of a finite group of data elements.

BACKGROUND

A blockchain refers to a form of distributed data structure, wherein a duplicate copy of the blockchain is maintained at each of a plurality of nodes in a distributed peer-to-peer (P2P) network (referred to below as a "blockchain network") and widely publicized. The blockchain comprises a chain of blocks of data, wherein each block comprises one or more transactions. Each transaction, other than so-called "coinbase transactions", points back to a preceding transaction in a sequence which may span one or more blocks going back to one or more coinbase transactions. Coinbase transactions are discussed further below. Transactions that are submitted to the blockchain network are included in new blocks. New blocks are created by a process often referred to as "mining", which involves each of a plurality of the nodes competing to perform "proof-of-work", i.e. solving a cryptographic puzzle based on a representation of a defined set of ordered and validated pending transactions waiting to be included in a new block of the blockchain. It should be noted that the blockchain may be pruned at some nodes, and the publication of blocks can be achieved through the publication of mere block headers.

The transactions in the blockchain may be used for one or more of the following purposes: to convey a digital asset (i.e. a number of digital tokens), to order a set of entries in a virtualised ledger or registry, to receive and process timestamp entries, and/or to time-order index pointers. A blockchain can also be exploited in order to layer additional functionality on top of the blockchain. For example blockchain protocols may allow for storage of additional user data or indexes to data in a transaction. There is no pre-specified limit to the maximum data capacity that can be stored within a single transaction, and therefore increasingly more complex data can be incorporated. For instance this may be used to store an electronic document in the blockchain, or audio or video data.

Nodes of the blockchain network (which are often referred to as "miners") perform a distributed transaction registration and verification process, which will be described in more detail later. In summary, during this process a node validates transactions and inserts them into a block template for which they attempt to identify a valid proof-of-work solution. Once a valid solution is found, a new block is propagated to other nodes of the network, thus enabling each node to record the new block on the blockchain. In order to have a transaction recorded in the blockchain, a user (e.g. a blockchain client application) sends the transaction to one of the nodes of the network to be propagated. Nodes which receive the transaction may race to find a proof-of-work solution incorporating the validated transaction into a new block. Each node is configured to enforce the same node protocol, which will include one or more conditions for a transaction to be valid. Invalid transactions will not be propagated nor incorporated into blocks. Assuming the transaction is validated and thereby accepted onto the blockchain, then the transaction (including any user data) will thus remain registered and indexed at each of the nodes in the blockchain network as an immutable public record.

The node who successfully solved the proof-of-work puzzle to create the latest block is typically rewarded with a new transaction called the "coinbase transaction" which distributes an amount of the digital asset, i.e. a number of tokens. The detection and rejection of invalid transactions is enforced by the actions of competing nodes who act as agents of the network and are incentivised to report and block malfeasance. The widespread publication of information allows users to continuously audit the performance of nodes. The publication of the mere block headers allows participants to ensure the ongoing integrity of the blockchain.

In an "output-based" model (sometimes referred to as a UTXO-based model), the data structure of a given transaction comprises one or more inputs and one or more outputs. Any spendable output comprises an element specifying an amount of the digital asset that is derivable from the proceeding sequence of transactions. The spendable output is sometimes referred to as a UTXO ("unspent transaction output"). The output may further comprise a locking script specifying a condition for the future redemption of the output. A locking script is a predicate defining the conditions necessary to validate and transfer digital tokens or assets. Each input of a transaction (other than a coinbase transaction) comprises a pointer (i.e. a reference) to such an output in a preceding transaction, and may further comprise an unlocking script for unlocking the locking script of the pointed-to output. So consider a pair of transactions, call them a first and a second transaction (or "target" transaction). The first transaction comprises at least one output specifying an amount of the digital asset, and comprising a locking script defining one or more conditions of unlocking the output. The second, target transaction comprises at least one input, comprising a pointer to the output of the first transaction, and an unlocking script for unlocking the output of the first transaction.

In such a model, when the second, target transaction is sent to the blockchain network to be propagated and recorded in the blockchain, one of the criteria for validity applied at each node will be that the unlocking script meets all of the one or more conditions defined in the locking script of the first transaction. Another will be that the output of the first transaction has not already been redeemed by another, earlier valid transaction. Any node that finds the target transaction invalid according to any of these conditions will not propagate it (as a valid transaction, but possibly to register an invalid transaction) nor include it in a new block to be recorded in the blockchain.

An alternative type of transaction model is an account-based model. In this case each transaction does not define the amount to be transferred by referring back to the UTXO of a preceding transaction in a sequence of past transactions, but rather by reference to an absolute account balance. The current state of all accounts is stored by the nodes separate to the blockchain and is updated constantly.

Blockchains provided a decentralised and permission-less global mechanism that enables a solution to the problem of fair-exchange between two mutually un-trusting parties without the need for third party arbitration or escrow. The fair exchange of data or information, for financial reward or in exchange for information such as digital goods, is embodied in a transaction protocol known as a Zero-Knowledge Contingent Payments (ZKCP). In a ZKCP, specified data is transferred from seller to buyer only if a payment is confirmed, and the payment from buyer to seller is only completed if the specified data is valid according to the conditions of the sale. Details of such a protocol are known but it is essentially based on the combination of a hash-time-locked contract (HTLC) with a zero-knowledge proof, which simultaneously verifies that some encrypted information (the 'digital good') is valid/correct and that the 'password' to decrypt this information is the data that must be revealed on the blockchain to claim the payment.

The central component of a ZKCP protocol is a zero-knowledge proof for a series of dependent statements about data/information validity or correctness, key validity and its corresponding hash value. Such complex composite statements require an efficient zero-knowledge proof system for general computations: in essence, this enables one party to run an arbitrary program with secret inputs and then prove to another party that the program accepted the inputs as valid and was executed correctly—without revealing anything about the secret inputs or the execution of the program.

Zero knowledge SNARKs (zkSNARKs) provide a method of proving, in zero-knowledge, the validity of arbitrary computations that can be expressed as arithmetic circuits. The two main distinguishing properties of zkSNARKs are that they are non-interactive (the prover sends the proof to the verifier in one move) and succinct (the proof is small and easy to verify).

SUMMARY

Known Zero-knowledge Succinct Non-interactive ARguments of Knowledge (zk-SNARKs) are an implementation of a general purpose proof system for arithmetic circuit satisfiability. In the SNARK framework, a statement encoded as an arithmetic circuit is converted into a construct called a Quadratic Arithmetic Program (QAP), which consists of a set of polynomial equations. The statement can them be proved by demonstrating the validity of this set of equations at a single point. The main advantage of the SNARK method is that the verifier only needs to perform a few elliptic curve (pairing) operations (taking a few ms) and the proof is very small (288 bytes) and independent of the circuit size.

The very small proof and verification time achieved by the SNARK method comes at the expense of a trusted set-up, non-standard cryptographic assumptions and a much heavier computational burden placed upon the prover. The SNARK method also requires the use of elliptic curve bi-linear pairings. However, the use of computationally feasible bi-linear pairings requires the use of special 'pairing-friendly' elliptic curves. This precludes the use of many standard cryptographic elliptic curve parameter sets, including the Bitcoin secp256k1. Statements involving general elliptic curve point-multiplications must then employ explicit circuits (which may be very large).

Additionally incorporating an explicit elliptic curve multiplication (key-statement) into the circuit, would multiply both the proving key size and proof generation time by at least an order of magnitude.

The invention enables the zero-knowledge proof of statements that involve elliptic curve public-private key relationships simultaneously with general arithmetic circuit satisfiability. This is achieved with negligible computational expense beyond proving satisfiability of the arithmetic circuit, and avoids the requirement of creating explicit arithmetic circuits for elliptic curve point multiplication operations, which would increase the computational expense of the proof substantially.

According to one aspect disclosed herein, there is provided a computer implemented method of providing proof that a statement is true while keeping a secret input to the statement a secret, the method performed on a computing device and comprising:

generating a zero knowledge proof using a public input, the secret input, and a proving key linked to an augmented verification circuit (500),
wherein the augmented verification circuit comprises (i) a verification circuit (400) arranged to receive the public input and secret input, supply the secret input to a function circuit (402) representing the statement to generate a function circuit output, and determine whether the public input corresponds to the function circuit output; and (ii) a multiplicative gate (502) arranged to receive the secret input and a dummy value; and
wherein the zero knowledge proof comprises a batched commitment to inputs of multiplicative gates of the augmented verification circuit (500), the batched commitment generated using a first vector comprising n components from a finite group of data elements, wherein the secret input is a discrete logarithm of a public element of said finite group of data elements; and
transmitting the zero knowledge proof to a verifying computing device to enable the verifying computing device to verify that the computing device has knowledge of the secret input.

According to another aspect disclosed herein, there is provided a computer implemented method of verifying that a statement is true without knowledge of a secret input to the statement, the method performed on a computing device and comprising:

receiving a zero knowledge proof from a proving computing device;
obtaining the statement;
verifying that the zero knowledge proof is valid using the zero knowledge proof, a public input and a verification key linked to an augmented verification circuit,
wherein the augmented verification circuit comprises (i) a verification circuit arranged to receive the public input and secret input, supply the secret input to a function circuit representing the statement to generate a function circuit output, and determine whether the public input corresponds to the function circuit output; and (ii) a multiplicative gate arranged to receive the secret input and a dummy value; and
wherein the zero knowledge proof comprises a batched commitment to inputs of multiplicative gates of the augmented verification circuit, the batched commitment generated using a first vector comprising n components from a finite group of data elements, wherein the secret input is a discrete logarithm of a public element of said finite group of data elements; and determining that the proving computing device has knowledge of the secret input based on said verifying.

BRIEF DESCRIPTION OF THE DRAWINGS

To assist understanding of embodiments of the present disclosure and to show how such embodiments may be put into effect, reference is made, by way of example only, to the accompanying drawings in which:

FIG. 2 schematically illustrates some examples of transactions which may be recorded in a blockchain.

DETAILED DESCRIPTION OF EMBODIMENTS

Example System Overview

Figure 1:
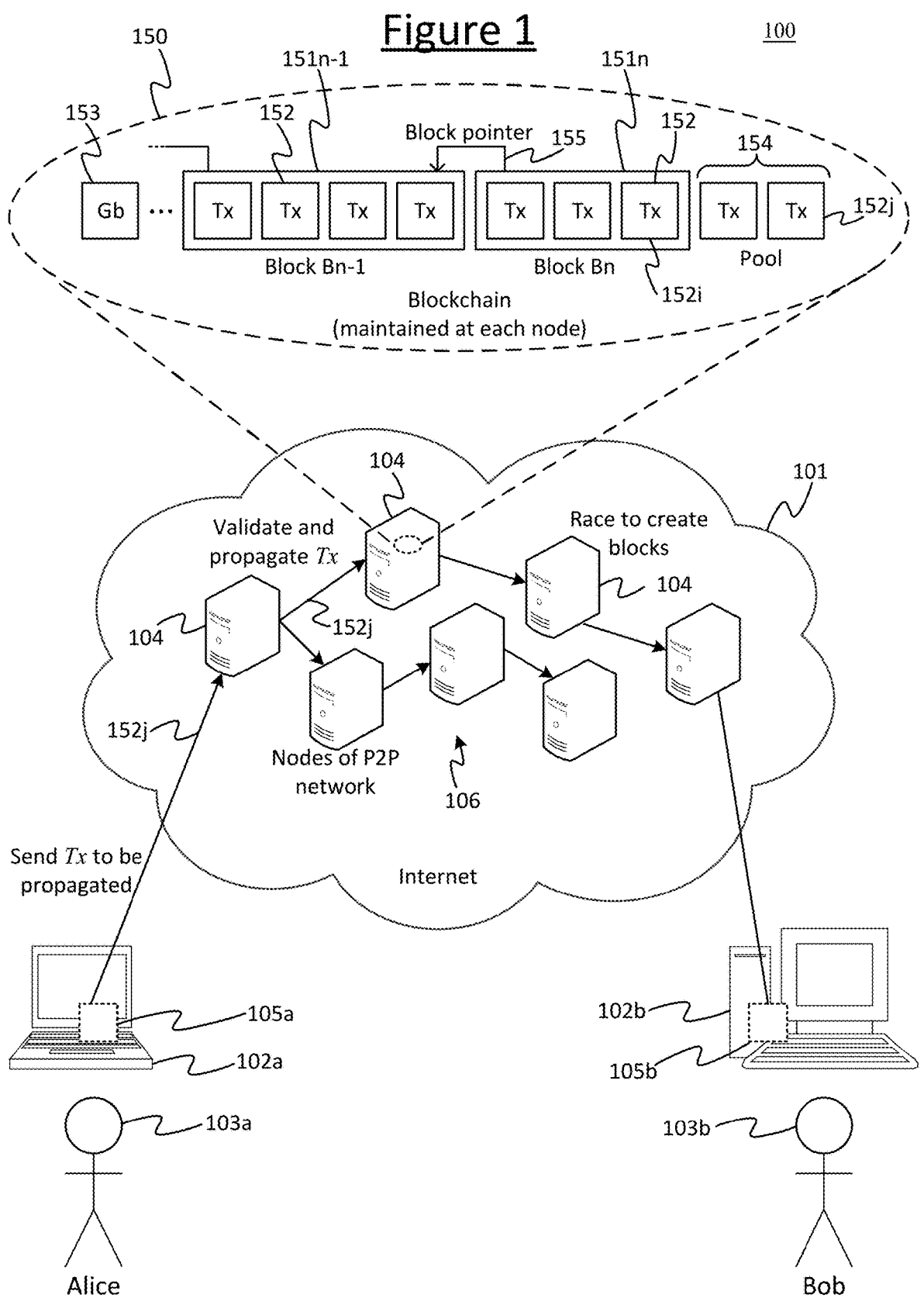
FIG. 1 is a schematic block diagram of a system for implementing a blockchain.

FIG. 1 shows an example system 100 for implementing a blockchain 150. The system 100 may comprise a packet-switched network 101, typically a wide-area internetwork such as the Internet. The packet-switched network 101 comprises a plurality of blockchain nodes 104 that may be arranged to form a peer-to-peer (P2P) network 106 within the packet-switched network 101. Whilst not illustrated, the blockchain nodes 104 may be arranged as a near-complete graph. Each blockchain node 104 is therefore highly connected to other blockchain nodes 104.

Each blockchain node 104 comprises computer equipment of a peer, with different ones of the nodes 104 belonging to different peers. Each blockchain node 104 comprises processing apparatus comprising one or more processors, e.g. one or more central processing units (CPUs), accelerator processors, application specific processors and/or field programmable gate arrays (FPGAs), and other equipment such as application specific integrated circuits (ASICs). Each node also comprises memory, i.e. computer-readable storage in the form of a non-transitory computer-readable medium or media. The memory may comprise one or more memory units employing one or more memory media, e.g. a magnetic medium such as a hard disk; an electronic medium such as a solid-state drive (SSD), flash memory or EEPROM; and/or an optical medium such as an optical disk drive.

The blockchain 150 comprises a chain of blocks of data 151, wherein a respective copy of the blockchain 150 is maintained at each of a plurality of blockchain nodes 104 in the distributed or blockchain network 106. As mentioned above, maintaining a copy of the blockchain 150 does not necessarily mean storing the blockchain 150 in full. Instead, the blockchain 150 may be pruned of data so long as each blockchain node 150 stores the block header (discussed below) of each block 151. Each block 151 in the chain comprises one or more transactions 152, wherein a transaction in this context refers to a kind of data structure. The nature of the data structure will depend on the type of transaction protocol used as part of a transaction model or scheme. A given blockchain will use one particular transaction protocol throughout. In one common type of transaction protocol, the data structure of each transaction 152 comprises at least one input and at least one output. Each output specifies an amount representing a quantity of a digital asset as property, an example of which is a user 103 to whom the output is cryptographically locked (requiring a signature or other solution of that user in order to be unlocked and thereby redeemed or spent). Each input points back to the output of a preceding transaction 152, thereby linking the transactions.

Each block 151 also comprises a block pointer 155 pointing back to the previously created block 151 in the chain so as to define a sequential order to the blocks 151. Each transaction 152 (other than a coinbase transaction) comprises a pointer back to a previous transaction so as to define an order to sequences of transactions (N.B. sequences of transactions 152 are allowed to branch). The chain of blocks 151 goes all the way back to a genesis block (Gb) 153 which was the first block in the chain. One or more original transactions 152 early on in the chain 150 pointed to the genesis block 153 rather than a preceding transaction.

Each of the blockchain nodes 104 is configured to forward transactions 152 to other blockchain nodes 104, and thereby cause transactions 152 to be propagated throughout the network 106. Each blockchain node 104 is configured to create blocks 151 and to store a respective copy of the same blockchain 150 in their respective memory. Each blockchain node 104 also maintains an ordered set (or "pool") 154 of transactions 152 waiting to be incorporated into blocks 151. The ordered pool 154 is often referred to as a "mempool". This term herein is not intended to limit to any particular blockchain, protocol or model. It refers to the ordered set of transactions which a node 104 has accepted as valid and for which the node 104 is obliged not to accept any other transactions attempting to spend the same output.

In a given present transaction 152j, the (or each) input comprises a pointer referencing the output of a preceding transaction 152i in the sequence of transactions, specifying that this output is to be redeemed or "spent" in the present transaction 152j. In general, the preceding transaction could be any transaction in the ordered set 154 or any block 151. The preceding transaction 152i need not necessarily exist at the time the present transaction 152j is created or even sent to the network 106, though the preceding transaction 152i will need to exist and be validated in order for the present transaction to be valid. Hence "preceding" herein refers to a predecessor in a logical sequence linked by pointers, not necessarily the time of creation or sending in a temporal sequence, and hence it does not necessarily exclude that the transactions 152i, 152j be created or sent out-of-order (see discussion below on orphan transactions). The preceding transaction 152i could equally be called the antecedent or predecessor transaction.

The input of the present transaction 152j also comprises the input authorisation, for example the signature of the user 103a to whom the output of the preceding transaction 152i is locked. In turn, the output of the present transaction 152j can be cryptographically locked to a new user or entity 103b.

The present transaction 152*j* can thus transfer the amount defined in the input of the preceding transaction 152*i* to the new user or entity 103*b* as defined in the output of the present transaction 152*j*. In some cases a transaction 152 may have multiple outputs to split the input amount between multiple users or entities (one of whom could be the original user or entity 103*a* in order to give change). In some cases a transaction can also have multiple inputs to gather together the amounts from multiple outputs of one or more preceding transactions, and redistribute to one or more outputs of the current transaction.

According to an output-based transaction protocol such as bitcoin, when a party 103, such as an individual user or an organization, wishes to enact a new transaction 152*j* (either manually or by an automated process employed by the party), then the enacting party sends the new transaction from its computer terminal 102 to a recipient. The enacting party or the recipient will eventually send this transaction to one or more of the blockchain nodes 104 of the network 106 (which nowadays are typically servers or data centres, but could in principle be other user terminals). It is also not excluded that the party 103 enacting the new transaction 152*j* could send the transaction directly to one or more of the blockchain nodes 104 and, in some examples, not to the recipient. A blockchain node 104 that receives a transaction checks whether the transaction is valid according to a blockchain node protocol which is applied at each of the blockchain nodes 104. The blockchain node protocol typically requires the blockchain node 104 to check that a cryptographic signature in the new transaction 152*j* matches the expected signature, which depends on the previous transaction 152*i* in an ordered sequence of transactions 152. In such an output-based transaction protocol, this may comprise checking that the cryptographic signature or other authorisation of the party 103 included in the input of the new transaction 152*j* matches a condition defined in the output of the preceding transaction 152*i* which the new transaction assigns, wherein this condition typically comprises at least checking that the cryptographic signature or other authorisation in the input of the new transaction 152*j* unlocks the output of the previous transaction 152*i* to which the input of the new transaction is linked to. The condition may be at least partially defined by a script included in the output of the preceding transaction 152*i*. Alternatively it could simply be fixed by the blockchain node protocol alone, or it could be due to a combination of these. Either way, if the new transaction 152*j* is valid, the blockchain node 104 forwards it to one or more other blockchain nodes 104 in the blockchain network 106. These other blockchain nodes 104 apply the same test according to the same blockchain node protocol, and so forward the new transaction 152*j* on to one or more further nodes 104, and so forth. In this way the new transaction is propagated throughout the network of blockchain nodes 104.

In an output-based model, the definition of whether a given output (e.g. UTXO) is assigned (e.g. spent) is whether it has yet been validly redeemed by the input of another, onward transaction 152*j* according to the blockchain node protocol. Another condition for a transaction to be valid is that the output of the preceding transaction 152*i* which it attempts to redeem has not already been redeemed by another transaction. Again if not valid, the transaction 152*j* will not be propagated (unless flagged as invalid and propagated for alerting) or recorded in the blockchain 150. This guards against double-spending whereby the transactor tries to assign the output of the same transaction more than once. An account-based model on the other hand guards against double-spending by maintaining an account balance. Because again there is a defined order of transactions, the account balance has a single defined state at any one time.

In addition to validating transactions, blockchain nodes 104 also race to be the first to create blocks of transactions in a process commonly referred to as mining, which is supported by "proof-of-work". At a blockchain node 104, new transactions are added to an ordered pool 154 of valid transactions that have not yet appeared in a block 151 recorded on the blockchain 150. The blockchain nodes then race to assemble a new valid block 151 of transactions 152 from the ordered set of transactions 154 by attempting to solve a cryptographic puzzle. Typically this comprises searching for a "nonce" value such that when the nonce is concatenated with a representation of the ordered pool of pending transactions 154 and hashed, then the output of the hash meets a predetermined condition. E.g. the predetermined condition may be that the output of the hash has a certain predefined number of leading zeros. Note that this is just one particular type of proof-of-work puzzle, and other types are not excluded. A property of a hash function is that it has an unpredictable output with respect to its input. Therefore this search can only be performed by brute force, thus consuming a substantive amount of processing resource at each blockchain node 104 that is trying to solve the puzzle.

The first blockchain node 104 to solve the puzzle announces this to the network 106, providing the solution as proof which can then be easily checked by the other blockchain nodes 104 in the network (once given the solution to a hash it is straightforward to check that it causes the output of the hash to meet the condition). The first blockchain node 104 propagates a block to a threshold consensus of other nodes that accept the block and thus enforce the protocol rules. The ordered set of transactions 154 then becomes recorded as a new block 151 in the blockchain 150 by each of the blockchain nodes 104. A block pointer 155 is also assigned to the new block 151*n* pointing back to the previously created block 151*n*-1 in the chain. The significant amount of effort, for example in the form of hash, required to create a proof-of-work solution signals the intent of the first node 104 to follow the rules of the blockchain protocol. Such rules include not accepting a transaction as valid if it assigns the same output as a previously validated transaction, otherwise known as double-spending. Once created, the block 151 cannot be modified since it is recognized and maintained at each of the blockchain nodes 104 in the blockchain network 106. The block pointer 155 also imposes a sequential order to the blocks 151. Since the transactions 152 are recorded in the ordered blocks at each blockchain node 104 in a network 106, this therefore provides an immutable public ledger of the transactions.

Note that different blockchain nodes 104 racing to solve the puzzle at any given time may be doing so based on different snapshots of the pool of yet-to-be published transactions 154 at any given time, depending on when they started searching for a solution or the order in which the transactions were received. Whoever solves their respective puzzle first defines which transactions 152 are included in the next new block 151*n* and in which order, and the current pool 154 of unpublished transactions is updated. The blockchain nodes 104 then continue to race to create a block from the newly-defined ordered pool of unpublished transactions 154, and so forth. A protocol also exists for resolving any "fork" that may arise, which is where two blockchain nodes 104 solve their puzzle within a very short time of one another such that a conflicting view of the blockchain gets propagated between nodes 104. In short, whichever prong of the fork grows the longest becomes the definitive blockchain 150. Note this should not affect the users or agents of the network as the same transactions will appear in both forks.

According to the bitcoin blockchain (and most other blockchains) a node that successfully constructs a new block 104 is granted the ability to newly assign an additional, accepted amount of the digital asset in a new special kind of transaction which distributes an additional defined quantity of the digital asset (as opposed to an inter-agent, or inter-user transaction which transfers an amount of the digital asset from one agent or user to another). This special type of transaction is usually referred to as a "coinbase transaction", but may also be termed an "initiation transaction" or "generation transaction". It typically forms the first transaction of the new block 151*n*. The proof-of-work signals the intent of the node that constructs the new block to follow the protocol rules allowing this special transaction to be redeemed later. The blockchain protocol rules may require a maturity period, for example 100 blocks, before this special transaction may be redeemed. Often a regular (non-generation) transaction 152 will also specify an additional transaction fee in one of its outputs, to further reward the blockchain node 104 that created the block 151*n* in which that transaction was published. This fee is normally referred to as the "transaction fee", and is discussed blow.

Due to the resources involved in transaction validation and publication, typically at least each of the blockchain nodes 104 takes the form of a server comprising one or more physical server units, or even whole a data centre. However in principle any given blockchain node 104 could take the form of a user terminal or a group of user terminals networked together.

The memory of each blockchain node 104 stores software configured to run on the processing apparatus of the blockchain node 104 in order to perform its respective role or roles and handle transactions 152 in accordance with the blockchain node protocol. It will be understood that any action attributed herein to a blockchain node 104 may be performed by the software run on the processing apparatus of the respective computer equipment. The node software may be implemented in one or more applications at the application layer, or a lower layer such as the operating system layer or a protocol layer, or any combination of these.

Also connected to the network 101 is the computer equipment 102 of each of a plurality of parties 103 in the role of consuming users. These users may interact with the blockchain network 106 but do not participate in validating transactions or constructing blocks. Some of these users or agents 103 may act as senders and recipients in transactions. Other users may interact with the blockchain 150 without necessarily acting as senders or recipients. For instance, some parties may act as storage entities that store a copy of the blockchain 150 (e.g. having obtained a copy of the blockchain from a blockchain node 104).

Some or all of the parties 103 may be connected as part of a different network, e.g. a network overlaid on top of the blockchain network 106. Users of the blockchain network (often referred to as "clients") may be said to be part of a system that includes the blockchain network 106; however, these users are not blockchain nodes 104 as they do not perform the roles required of the blockchain nodes. Instead, each party 103 may interact with the blockchain network 106 and thereby utilize the blockchain 150 by connecting to (i.e. communicating with) a blockchain node 106. Two parties 103 and their respective equipment 102 are shown for illustrative purposes: a first party 103*a* and his/her respective computer equipment 102*a*, and a second party 103*b* and his/her respective computer equipment 102*b*. It will be understood that many more such parties 103 and their respective computer equipment 102 may be present and participating in the system 100, but for convenience they are not illustrated. Each party 103 may be an individual or an organization. Purely by way of illustration the first party 103*a* is referred to herein as Alice and the second party 103*b* is referred to as Bob, but it will be appreciated that this is not limiting and any reference herein to Alice or Bob may be replaced with "first party" and "second "party" respectively.

The computer equipment 102 of each party 103 comprises respective processing apparatus comprising one or more processors, e.g. one or more CPUs, GPUs, other accelerator processors, application specific processors, and/or FPGAs. The computer equipment 102 of each party 103 further comprises memory, i.e. computer-readable storage in the form of a non-transitory computer-readable medium or media. This memory may comprise one or more memory units employing one or more memory media, e.g. a magnetic medium such as hard disk; an electronic medium such as an SSD, flash memory or EEPROM; and/or an optical medium such as an optical disc drive. The memory on the computer equipment 102 of each party 103 stores software comprising a respective instance of at least one client application 105 arranged to run on the processing apparatus. It will be understood that any action attributed herein to a given party 103 may be performed using the software run on the processing apparatus of the respective computer equipment 102. The computer equipment 102 of each party 103 comprises at least one user terminal, e.g. a desktop or laptop computer, a tablet, a smartphone, or a wearable device such as a smartwatch. The computer equipment 102 of a given party 103 may also comprise one or more other networked resources, such as cloud computing resources accessed via the user terminal.

The client application 105 may be initially provided to the computer equipment 102 of any given party 103 on suitable computer-readable storage medium or media, e.g. downloaded from a server, or provided on a removable storage device such as a removable SSD, flash memory key, removable EEPROM, removable magnetic disk drive, magnetic floppy disk or tape, optical disk such as a CD or DVD ROM, or a removable optical drive, etc.

The client application 105 comprises at least a "wallet" function. This has two main functionalities. One of these is to enable the respective party 103 to create, authorise (for example sign) and send transactions 152 to one or more bitcoin nodes 104 to then be propagated throughout the network of blockchain nodes 104 and thereby included in the blockchain 150. The other is to report back to the respective party the amount of the digital asset that he or she currently owns. In an output-based system, this second functionality comprises collating the amounts defined in the outputs of the various 152 transactions scattered throughout the blockchain 150 that belong to the party in question.

Note: whilst the various client functionality may be described as being integrated into a given client application 105, this is not necessarily limiting and instead any client functionality described herein may instead be implemented in a suite of two or more distinct applications, e.g. interfacing via an API, or one being a plug-in to the other. More generally the client functionality could be implemented at the application layer or a lower layer such as the operating system, or any combination of these. The following will be described in terms of a client application 105 but it will be appreciated that this is not limiting.

The instance of the client application or software 105 on each computer equipment 102 is operatively coupled to at least one of the blockchain nodes 104 of the network 106. This enables the wallet function of the client 105 to send transactions 152 to the network 106. The client 105 is also able to contact blockchain nodes 104 in order to query the blockchain 150 for any transactions of which the respective party 103 is the recipient (or indeed inspect other parties' transactions in the blockchain 150, since in embodiments the blockchain 150 is a public facility which provides trust in transactions in part through its public visibility). The wallet function on each computer equipment 102 is configured to formulate and send transactions 152 according to a transaction protocol. As set out above, each blockchain node 104 runs software configured to validate transactions 152 according to the blockchain node protocol, and to forward transactions 152 in order to propagate them throughout the blockchain network 106. The transaction protocol and the node protocol correspond to one another, and a given transaction protocol goes with a given node protocol, together implementing a given transaction model. The same transaction protocol is used for all transactions 152 in the blockchain 150. The same node protocol is used by all the nodes 104 in the network 106.

When a given party 103, say Alice, wishes to send a new transaction 152*j* to be included in the blockchain 150, then she formulates the new transaction in accordance with the relevant transaction protocol (using the wallet function in her client application 105). She then sends the transaction 152 from the client application 105 to one or more blockchain nodes 104 to which she is connected. E.g. this could be the blockchain node 104 that is best connected to Alice's computer 102. When any given blockchain node 104 receives a new transaction 152*j*, it handles it in accordance with the blockchain node protocol and its respective role. This comprises first checking whether the newly received transaction 152*j* meets a certain condition for being "valid", examples of which will be discussed in more detail shortly. In some transaction protocols, the condition for validation may be configurable on a per-transaction basis by scripts included in the transactions 152. Alternatively the condition could simply be a built-in feature of the node protocol, or be defined by a combination of the script and the node protocol.

On condition that the newly received transaction 152*j* passes the test for being deemed valid (i.e. on condition that it is "validated"), any blockchain node 104 that receives the transaction 152*j* will add the new validated transaction 152 to the ordered set of transactions 154 maintained at that blockchain node 104. Further, any blockchain node 104 that receives the transaction 152*j* will propagate the validated transaction 152 onward to one or more other blockchain nodes 104 in the network 106. Since each blockchain node 104 applies the same protocol, then assuming the transaction 152*j* is valid, this means it will soon be propagated throughout the whole network 106.

Once admitted to the ordered pool of pending transactions 154 maintained at a given blockchain node 104, that blockchain node 104 will start competing to solve the proof-of-work puzzle on the latest version of their respective pool of 154 including the new transaction 152 (recall that other blockchain nodes 104 may be trying to solve the puzzle based on a different pool of transactions 154, but whoever gets there first will define the set of transactions that are included in the latest block 151. Eventually a blockchain node 104 will solve the puzzle for a part of the ordered pool 154 which includes Alice's transaction 152*j*). Once the proof-of-work has been done for the pool 154 including the new transaction 152*j*, it immutably becomes part of one of the blocks 151 in the blockchain 150. Each transaction 152 comprises a pointer back to an earlier transaction, so the order of the transactions is also immutably recorded.

Different blockchain nodes 104 may receive different instances of a given transaction first and therefore have conflicting views of which instance is 'valid' before one instance is published in a new block 151, at which point all blockchain nodes 104 agree that the published instance is the only valid instance. If a blockchain node 104 accepts one instance as valid, and then discovers that a second instance has been recorded in the blockchain 150 then that blockchain node 104 must accept this and will discard (i.e. treat as invalid) the instance which it had initially accepted (i.e. the one that has not been published in a block 151).

An alternative type of transaction protocol operated by some blockchain networks may be referred to as an "account-based" protocol, as part of an account-based transaction model. In the account-based case, each transaction does not define the amount to be transferred by referring back to the UTXO of a preceding transaction in a sequence of past transactions, but rather by reference to an absolute account balance. The current state of all accounts is stored, by the nodes of that network, separate to the blockchain and is updated constantly. In such a system, transactions are ordered using a running transaction tally of the account (also called the "position"). This value is signed by the sender as part of their cryptographic signature and is hashed as part of the transaction reference calculation. In addition, an optional data field may also be signed the transaction. This data field may point back to a previous transaction, for example if the previous transaction ID is included in the data field.

UTXO-Based Model

FIG. 2 illustrates an example transaction protocol. This is an example of a UTXO-based protocol. A transaction 152 (abbreviated "Tx") is the fundamental data structure of the blockchain 150 (each block 151 comprising one or more transactions 152). The following will be described by reference to an output-based or "UTXO" based protocol. However, this is not limiting to all possible embodiments. Note that while the example UTXO-based protocol is described with reference to bitcoin, it may equally be implemented on other example blockchain networks.

In a UTXO-based model, each transaction ("Tx") 152 comprises a data structure comprising one or more inputs 202, and one or more outputs 203. Each output 203 may comprise an unspent transaction output (UTXO), which can be used as the source for the input 202 of another new transaction (if the UTXO has not already been redeemed). The UTXO includes a value specifying an amount of a digital asset. This represents a set number of tokens on the distributed ledger. The UTXO may also contain the transaction ID of the transaction from which it came, amongst other information. The transaction data structure may also comprise a header 201, which may comprise an indicator of the size of the input field(s) 202 and output field(s) 203. The header 201 may also include an ID of the transaction. In embodiments the transaction ID is the hash of the transaction data (excluding the transaction ID itself) and stored in the header 201 of the raw transaction 152 submitted to the nodes 104.

Say Alice 103*a* wishes to create a transaction 152*j* transferring an amount of the digital asset in question to Bob 103*b*. In FIG. 2 Alice's new transaction 152*j* is labelled "Tx1". It takes an amount of the digital asset that is locked to Alice in the output 203 of a preceding transaction 152*i* in the sequence, and transfers at least some of this to Bob. The preceding transaction 152*i* is labelled "Tx0" in FIG. 2. Tx0 and Tx1 are just arbitrary labels. They do not necessarily mean that Tx0 is the first transaction in the blockchain 151, nor that Tx1 is the immediate next transaction in the pool 154. Tx1 could point back to any preceding (i.e. antecedent) transaction that still has an unspent output 203 locked to Alice.

The preceding transaction Tx0 may already have been validated and included in a block 151 of the blockchain 150 at the time when Alice creates her new transaction Tx1, or at least by the time she sends it to the network 106. It may already have been included in one of the blocks 151 at that time, or it may be still waiting in the ordered set 154 in which case it will soon be included in a new block 151. Alternatively Tx0 and Tx1 could be created and sent to the network 106 together, or Tx0 could even be sent after Tx1 if the node protocol allows for buffering "orphan" transactions. The terms "preceding" and "subsequent" as used herein in the context of the sequence of transactions refer to the order of the transactions in the sequence as defined by the transaction pointers specified in the transactions (which transaction points back to which other transaction, and so forth). They could equally be replaced with "predecessor" and "successor", or "antecedent" and "descendant", "parent" and "child", or such like. It does not necessarily imply an order in which they are created, sent to the network 106, or arrive at any given blockchain node 104. Nevertheless, a subsequent transaction (the descendent transaction or "child") which points to a preceding transaction (the antecedent transaction or "parent") will not be validated until and unless the parent transaction is validated. A child that arrives at a blockchain node 104 before its parent is considered an orphan. It may be discarded or buffered for a certain time to wait for the parent, depending on the node protocol and/or node behaviour.

One of the one or more outputs 203 of the preceding transaction Tx0 comprises a particular UTXO, labelled here UTXO0. Each UTXO comprises a value specifying an amount of the digital asset represented by the UTXO, and a locking script which defines a condition which must be met by an unlocking script in the input 202 of a subsequent transaction in order for the subsequent transaction to be validated, and therefore for the UTXO to be successfully redeemed. Typically the locking script locks the amount to a particular party (the beneficiary of the transaction in which it is included). I.e. the locking script defines an unlocking condition, typically comprising a condition that the unlocking script in the input of the subsequent transaction comprises the cryptographic signature of the party to whom the preceding transaction is locked.

The locking script (aka scriptPubKey) is a piece of code written in the domain specific language recognized by the node protocol. A particular example of such a language is called "Script" (capital S) which is used by the blockchain network. The locking script specifies what information is required to spend a transaction output 203, for example the requirement of Alice's signature. Unlocking scripts appear in the outputs of transactions. The unlocking script (aka scriptSig) is a piece of code written the domain specific language that provides the information required to satisfy the locking script criteria. For example, it may contain Bob's signature. Unlocking scripts appear in the input 202 of transactions.

So in the example illustrated, UTXO0 in the output 203 of Tx0 comprises a locking script [Checksig PA] which requires a signature Sig PA of Alice in order for UTXO0 to be redeemed (strictly, in order for a subsequent transaction attempting to redeem UTXO0 to be valid). [Checksig PA] contains a representation (i.e. a hash) of the public key PA from a public-private key pair of Alice. The input 202 of Tx1 comprises a pointer pointing back to Tx1 (e.g. by means of its transaction ID, TxID0, which in embodiments is the hash of the whole transaction Tx0). The input 202 of Tx1 comprises an index identifying UTXO0 within Tx0, to identify it amongst any other possible outputs of Tx0. The input 202 of Tx1 further comprises an unlocking script <Sig PA> which comprises a cryptographic signature of Alice, created by Alice applying her private key from the key pair to a predefined portion of data (sometimes called the "message" in cryptography). The data (or "message") that needs to be signed by Alice to provide a valid signature may be defined by the locking script, or by the node protocol, or by a combination of these.

When the new transaction Tx1 arrives at a blockchain node 104, the node applies the node protocol. This comprises running the locking script and unlocking script together to check whether the unlocking script meets the condition defined in the locking script (where this condition may comprise one or more criteria). In embodiments this involves concatenating the two scripts:

<Sig PA><PA>| |[Checksig PA]

where "| |" represents a concatenation and "< . . . >" means place the data on the stack, and "[ . . . ]" is a function comprised by the locking script (in this example a stack-based language). Equivalently the scripts may be run one after the other, with a common stack, rather than concatenating the scripts. Either way, when run together, the scripts use the public key PA of Alice, as included in the locking script in the output of Tx0, to authenticate that the unlocking script in the input of Tx1 contains the signature of Alice signing the expected portion of data. The expected portion of data itself (the "message") also needs to be included in order to perform this authentication. In embodiments the signed data comprises the whole of Tx1 (so a separate element does not need to be included specifying the signed portion of data in the clear, as it is already inherently present).

The details of authentication by public-private cryptography will be familiar to a person skilled in the art. Basically, if Alice has signed a message using her private key, then given Alice's public key and the message in the clear, another entity such as a node 104 is able to authenticate that the message must have been signed by Alice. Signing typically comprises hashing the message, signing the hash, and tagging this onto the message as a signature, thus enabling any holder of the public key to authenticate the signature. Note therefore that any reference herein to signing a particular piece of data or part of a transaction, or such like, can in embodiments mean signing a hash of that piece of data or part of the transaction.

If the unlocking script in Tx1 meets the one or more conditions specified in the locking script of Tx0 (so in the example shown, if Alice's signature is provided in Tx1 and authenticated), then the blockchain node 104 deems Tx1 valid. This means that the blockchain node 104 will add Tx1 to the ordered pool of pending transactions 154. The blockchain node 104 will also forward the transaction Tx1 to one or more other blockchain nodes 104 in the network 106, so that it will be propagated throughout the network 106. Once Tx1 has been validated and included in the blockchain 150, this defines UTXO0 from Tx0 as spent. Note that Tx1 can only be valid if it spends an unspent transaction output 203. If it attempts to spend an output that has already been spent by another transaction 152, then Tx1 will be invalid even if all the other conditions are met. Hence the blockchain node

104 also needs to check whether the referenced UTXO in the preceding transaction $Tx_0$ is already spent (i.e. whether it has already formed a valid input to another valid transaction). This is one reason why it is important for the blockchain 150 to impose a defined order on the transactions 152. In practice a given blockchain node 104 may maintain a separate database marking which UTXOs 203 in which transactions 152 have been spent, but ultimately what defines whether a UTXO has been spent is whether it has already formed a valid input to another valid transaction in the blockchain 150.

If the total amount specified in all the outputs 203 of a given transaction 152 is greater than the total amount pointed to by all its inputs 202, this is another basis for invalidity in most transaction models. Therefore such transactions will not be propagated nor included in a block 151.

Note that in UTXO-based transaction models, a given UTXO needs to be spent as a whole. It cannot "leave behind" a fraction of the amount defined in the UTXO as spent while another fraction is spent. However the amount from the UTXO can be split between multiple outputs of the next transaction. E.g. the amount defined in $UTXO_0$ in $Tx_0$ can be split between multiple UTXOs in $Tx_1$. Hence if Alice does not want to give Bob all of the amount defined in $UTXO_0$, she can use the remainder to give herself change in a second output of $Tx_1$, or pay another party.

In practice Alice will also usually need to include a fee for the bitcoin node 104 that successfully includes her transaction 104 in a block 151. If Alice does not include such a fee, $Tx_0$ may be rejected by the blockchain nodes 104, and hence although technically valid, may not be propagated and included in the blockchain 150 (the node protocol does not force blockchain nodes 104 to accept transactions 152 if they don't want). In some protocols, the transaction fee does not require its own separate output 203 (i.e. does not need a separate UTXO). Instead any difference between the total amount pointed to by the input(s) 202 and the total amount of specified in the output(s) 203 of a given transaction 152 is automatically given to the blockchain node 104 publishing the transaction. E.g. say a pointer to $UTXO_0$ is the only input to $Tx_1$, and $Tx_1$ has only one output $UTXO_1$. If the amount of the digital asset specified in $UTXO_0$ is greater than the amount specified in $UTXO_1$, then the difference may be assigned by the node 104 that wins the proof-of-work race to create the block containing $UTXO_1$. Alternatively or additionally however, it is not necessarily excluded that a transaction fee could be specified explicitly in its own one of the UTXOs 203 of the transaction 152.

Alice and Bob's digital assets consist of the UTXOs locked to them in any transactions 152 anywhere in the blockchain 150. Hence typically, the assets of a given party 103 are scattered throughout the UTXOs of various transactions 152 throughout the blockchain 150. There is no one number stored anywhere in the blockchain 150 that defines the total balance of a given party 103. It is the role of the wallet function in the client application 105 to collate together the values of all the various UTXOs which are locked to the respective party and have not yet been spent in another onward transaction. It can do this by querying the copy of the blockchain 150 as stored at any of the bitcoin nodes 104.

Note that the script code is often represented schematically (i.e. not using the exact language). For example, one may use operation codes (opcodes) to represent a particular function. "OP_ . . . " refers to a particular opcode of the Script language. As an example, OP_RETURN is an opcode of the Script language that when preceded by OP_FALSE at the beginning of a locking script creates an unspendable output of a transaction that can store data within the transaction, and thereby record the data immutably in the blockchain 150. E.g. the data could comprise a document which it is desired to store in the blockchain.

Typically an input of a transaction contains a digital signature corresponding to a public key PA. In embodiments this is based on the ECDSA using the elliptic curve secp256k1. A digital signature signs a particular piece of data. In some embodiments, for a given transaction the signature will sign part of the transaction input, and some or all of the transaction outputs. The particular parts of the outputs it signs depends on the SIGHASH flag. The SIGHASH flag is usually a 4-byte code included at the end of a signature to select which outputs are signed (and thus fixed at the time of signing).

The locking script is sometimes called "scriptPubKey" referring to the fact that it typically comprises the public key of the party to whom the respective transaction is locked. The unlocking script is sometimes called "scriptSig" referring to the fact that it typically supplies the corresponding signature. However, more generally it is not essential in all applications of a blockchain 150 that the condition for a UTXO to be redeemed comprises authenticating a signature. More generally the scripting language could be used to define any one or more conditions. Hence the more general terms "locking script" and "unlocking script" may be preferred.

Client Software

Figure 3A:
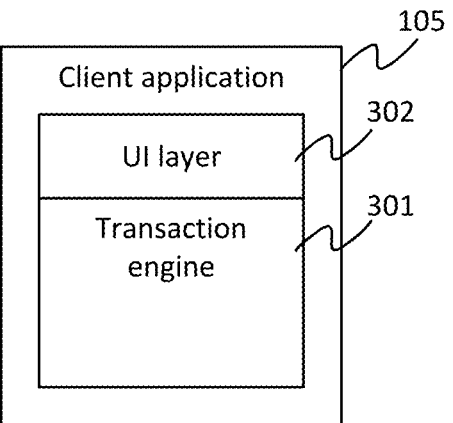
FIG. 3A is a schematic block diagram of a client application.

FIG. 3A illustrates an example implementation of the client application 105 for implementing embodiments of the presently disclosed scheme. The client application 105 comprises a transaction engine 301 and a user interface (UI) layer 302. The transaction engine 301 is configured to implement the underlying transaction-related functionality of the client 105, such as to formulate transactions 152, send transactions to one or more nodes 104 to be propagated through the blockchain network 106, in accordance with the schemes discussed above and as discussed in further detail shortly.

The UI layer 302 is configured to render a user interface via a user input/output (I/O) means of the respective user's computer equipment 102, including outputting information to the respective user 103 via a user output means of the equipment 102, and receiving inputs back from the respective user 103 via a user input means of the equipment 102. For example the user output means could comprise one or more display screens (touch or non-touch screen) for providing a visual output, one or more speakers for providing an audio output, and/or one or more haptic output devices for providing a tactile output, etc. The user input means could comprise for example the input array of one or more touch screens (the same or different as that/those used for the output means); one or more cursor-based devices such as mouse, trackpad or trackball; one or more microphones and speech or voice recognition algorithms for receiving a speech or vocal input; one or more gesture-based input devices for receiving the input in the form of manual or bodily gestures; or one or more mechanical buttons, switches or joysticks, etc.

Note: whilst the various functionality herein may be described as being integrated into the same client application 105, this is not necessarily limiting and instead they could be implemented in a suite of two or more distinct applications, e.g. one being a plug-in to the other or interfacing via an API (application programming interface). For instance, the functionality of the transaction engine 301 may be implemented in a separate application than the UI layer 302, or the functionality of a given module such as the transaction engine 301 could be split between more than one application. Nor is it excluded that some or all of the described functionality could be implemented at, say, the operating system layer. Where reference is made anywhere herein to a single or given application 105, or such like, it will be appreciated that this is just by way of example, and more generally the described functionality could be implemented in any form of software.

Figure 3B:
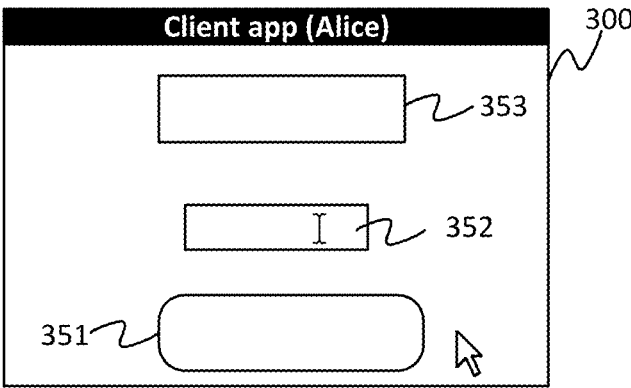
FIG. 3B is a schematic mock-up of an example user interface that may be presented by the client application of FIG. 3A.

FIG. 3B gives a mock-up of an example of the user interface (UI) 300 which may be rendered by the UI layer 302 of the client application 105*a* on Alice's equipment 102*a*. It will be appreciated that a similar UI may be rendered by the client 105*b* on Bob's equipment 102*b*, or that of any other party.

By way of illustration FIG. 3B shows the UI 300 from Alice's perspective. The UI 300 may comprise one or more UI elements 351, 352, 353 rendered as distinct UI elements via the user output means.

For example, the UI elements may comprise one or more user-selectable elements 351 which may be, such as different on-screen buttons, or different options in a menu, or such like. The user input means is arranged to enable the user 103 (in this case Alice 103*a*) to select or otherwise operate one of the options, such as by clicking or touching the UI element on-screen, or speaking a name of the desired option (N.B. the term "manual" as used herein is meant only to contrast against automatic, and does not necessarily limit to the use of the hand or hands). The options enable the user (Alice) to formulate transactions 152 and send transactions to one or more nodes 104 to be propagated through the blockchain network 106

Alternatively or additionally, the UI elements may comprise one or more data entry fields 352, through which the user can formulate transactions 152 and send transactions to one or more nodes 104 to be propagated through the blockchain network 106. These data entry fields are rendered via the user output means, e.g. on-screen, and the data can be entered into the fields through the user input means, e.g. a keyboard or touchscreen. Alternatively the data could be received orally for example based on speech recognition.

Alternatively or additionally, the UI elements may comprise one or more information elements 353 output to output information to the user. E.g. this/these could be rendered on screen or audibly.

It will be appreciated that the particular means of rendering the various UI elements, selecting the options and entering data is not material. The functionality of these UI elements will be discussed in more detail shortly. It will also be appreciated that the UI 300 shown in FIG. 3B is only a schematized mock-up and in practice it may comprise one or more further UI elements, which for conciseness are not illustrated.

Commitments

Central to many interactive zero-knowledge protocols are commitment schemes, which are used to for arithmetic circuit satisfiability. A commitment enables a prover to commit to a secret value in advance, and then later verifiably reveal (open) the secret value. A commitment scheme has two main properties. Firstly, it is hiding—the commitment keeps the value secret. Secondly, it is binding—the commitment can only be opened to the originally committed value. A Pedersen commitment scheme involves two elliptic curve generator points: G and F in the group G of prime order p, known to all parties. The committer generates a secure random number r in the field of prime integers $Z_p$, and then computes the commitment (via elliptic curve addition/multiplication) to the secret value s:

$$Com(s, r) = s \times G + r \times F,$$

wherein x denotes elliptic curve point multiplication.

The committer can at a later stage fully open the commitment (i.e. it can be verified), by providing the values s and r. The committer can also open the commitment in response to a specific challenge value as part of a $\Sigma$ protocol, without revealing the secret s or random number r).

Pedersen commitments are additively homomorphic, meaning that adding (on the elliptic curve) two commitments results in a commitment to the sum of the committed values, i.e.:

$$(s_1 \times G + r_1 \times F) + (s_2 \times G + r_2 \times F) = (s_1 + s_2) \times G + (r_1 + r_2) \times F$$

Proofs of arithmetic circuit satisfiability can be achieved in 'zero knowledge'. An arithmetic circuit (over a field $Z_p$) is a virtual construction of arithmetic gates that are connected by wires (forming a directed acyclic graph), that is capable of performing an arbitrarily complex computation, wherein the computation is limited to integer operations and must have no data dependant loops or mutable state.

Each gate has two input wires and one output wire and performs either a multiplication ($\times$) or addition ($+$) operation on the inputs.

In practice, a complete circuit has free input wires and free output wires that define the external (circuit) input and output values. A legal assignment is a definition of the values of the wires as those, which satisfy the circuit, i.e. each wire is assigned a value where the output of each gate correctly corresponds to the product or sum of the inputs (i.e. the gate is consistent).

There are several methods that have been developed to significantly improve the performance of the parallel $\Sigma$ protocol approach to proving arithmetic circuit satisfiability. Known approaches including those by Bootle and Groth involve batching the commitments to circuit wire values to substantially reduce the size of data that must be sent from the prover to the verifier (i.e. reducing the communication complexity).

Again, as a comparison for proving the satisfiability of the same SHA circuit, the Bootle protocol has a proving key size of just 5 KB and a key generation time of 180 ms. The Proof size is 24 KB and takes approximately 4 seconds to generate, and the proof also takes approximately 4 seconds to verify.

These methods are not described in full here, except to state that the main vector batching protocol employed is described in the steps below. This follows the same properties as the standard Pedersen commitment, but committing to n elements ($m=m_1, \ldots, m_n$) only requires the sending of a single group element:

1. The prover and verifier agree on a group element $F \leftarrow G$
2. The prover generates n random numbers $x_1, \ldots, x_n, F \leftarrow Z_p$
3. The prover computes the points $K_i = x_i \times F$ (for i= 1, ..., n). These values form a proving key PrK that is sent to the verifier.
4. The prover generates a random value: $r \leftarrow Z_p$ 5. The prover computes the commitment:

$$Com(m) = r \times F + \sum_{i=1}^{n} m_i \times K_i$$

and sends it to the verifier.

Vector Pedersen commitments, or batched Pedersen commitments is a generalization of Pedersen scheme to commit to a vector x∈

$$\mathbb{Z}_p^n$$

using a single point C∈ $\mathbb{C}$ . We refer herein to $\mathbb{C}$ as an elliptic curve, or a subgroup of the curve, of prime order p. We denote points in $\mathbb{C}$ with upper case letters, and field elements in $\mathbb{Z}_p$ with lower case letters, with vectors in bold.

The scheme has two algorithms. A description of the elliptic curve C is assumed to be an implicit input to both algorithms.

Commit Com(x, CK; r): On input message vector x= $(x_1, \ldots x_n)$∈

$$\mathbb{Z}_p^n,$$

a random element r∈ $\mathbb{Z}_p$ and a commitment key CK:= $(G_0, G_1 \ldots G_n)$∈ $\mathbb{C}^{n+1}$ output point:

$$C = r \times G_0 + x_1 {\times} G_1 + \ldots + x_n {\times} G_n$$

Here the commit operation outputs the linear combination of the commitment key elements dictated by the message scalars x1, . . . , $x_n$ and randomness r.

Verify commit VerifyCom(x, r, C, CK): On input opening (x, r)∈

$$\mathbb{Z}_p^n \times \mathbb{Z}_p$$

a commitment C∈ $\mathbb{C}$ and a commitment key G∈ $\mathbb{C}^{n+1}$, compute C*=Com(x, CK; r). If C*=C output b=T (accept). Else output b=1 (reject).

Here, the verify commit operation re-executes the commit operation and checks against the given message x=x1, . . . , $x_n$ and randomness r.

Providing Proof of a Statement

Overall, one aspect of the invention resides in a computer-implemented method for enabling zero-knowledge proof or verification of a statement. A prover can prove to a verifier that a statement is true while keeping a witness to the statement a secret, using the method herein. In some embodiments, the statements are composite statements that involve both arithmetic circuit satisfiability and dependent statements about the validity of public keys (key-statement proofs) simultaneously.

The method herein can be used in known protocols for circuit satisfiability, such as existing discrete-log based zero-knowledge proof protocols. The method is particularly suited to protocols that do not require the use of bilinear pairing-friendly elliptic curves.

The invention enables an efficient zero knowledge verification of composite statements that involve both arithmetic circuit satisfiability and dependent statements about the validity of public keys (key-statement proofs) simultaneously. Public key elliptic curve specifications are employed within a homomorphic commitment function to prove circuit satisfiability. This enables the proof of public key statements corresponding to private keys used as circuit inputs and/or outputs in an efficient manner.

The proof size and computational expense of generating proofs for statements involving both circuit satisfiability and elliptic curve key pairs can be substantially reduced. The method herein can be easily incorporated into existing discrete-log based zero-knowledge proof protocols for circuit satisfiability, which do not require the use of bilinear pairing-friendly elliptic curves. The method, using discrete-log based zero-knowledge proofs, is fully compatible with the Bitcoin secp256k1 standard.

This invention concerns a method to enable the proof a particular class of composite statements that involve relationships with elliptic curve public/private key pairs (based on elliptic curve point multiplications).

Using zkSNARKs to prove statements that involve arbitrary cryptographic elliptic curve key operations is deemed impractical and, therefore, the method uses information on elliptic curve public keys that is extracted directly from the 'homomorphic hiding' (or commitment scheme) used in the construction of proofs for generic circuit satisfiability. The particular type of elliptic curve involved in the statement of the method is identical to that used in the circuit commitment scheme.

However, the SNARK method involves pairing operations and therefore requires special bilinear pairing-friendly elliptic curves. This precludes using zk-SNARKs based on elliptic curves (e.g. Groth16) because the elliptic curves used on some blockchains are not compatible with bilinear pairing-friendly elliptic curves. By way of example, statements relating to Bitcoin public keys use the Bitcoin secp256k1 curve, which is not compatible.

The method of the invention, therefore, is compatible with alternative protocols for proving arithmetic circuit satisfiability that do not rely on pairings and have fewer cryptographic assumptions. Embodiments of the present disclosure use zk-SNARKs based on discrete logarithms (e.g. the Bootle and Bulletproof families of zk-SNARKs). Overall, the method of the invention is more efficient than zkSNARKS based on elliptic curves because fewer computations are required and the proof size is reduced for trustless exchange applications.

Figure 4:
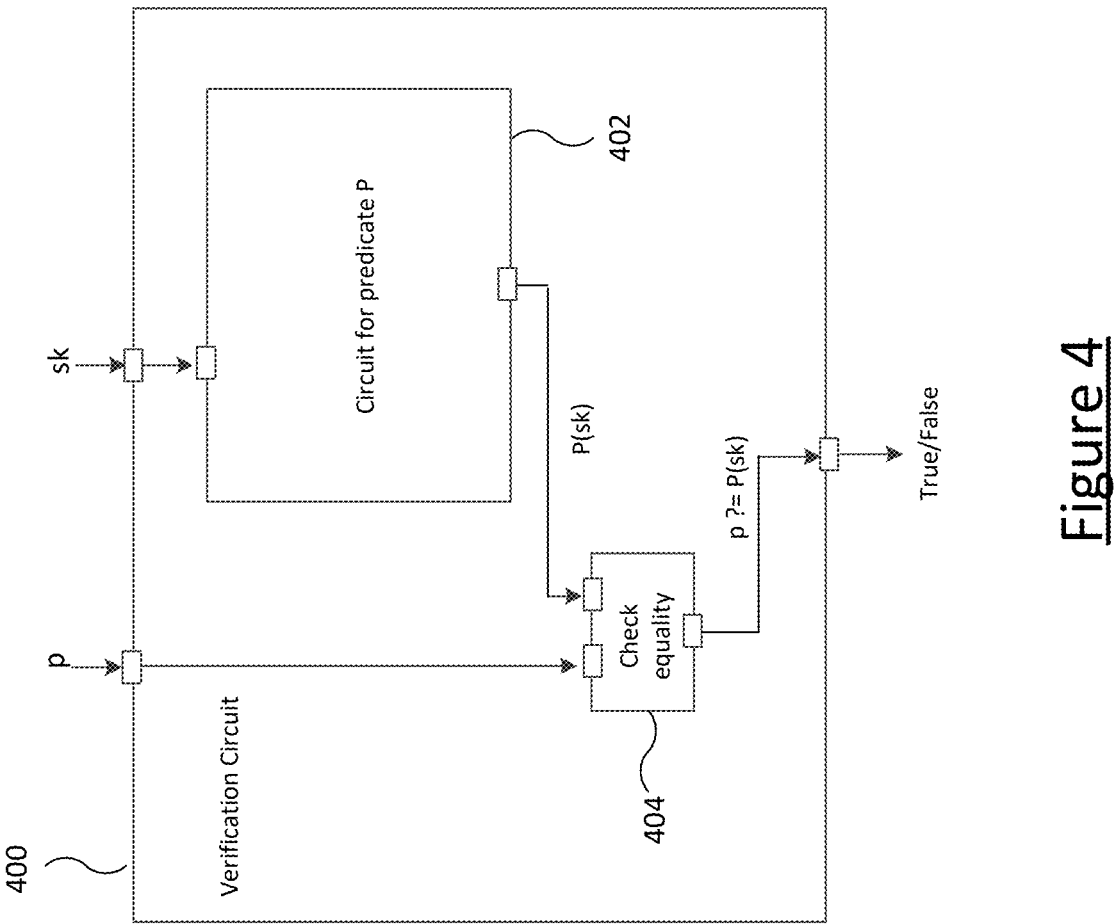
FIG. 4 is a schematic block diagram of a verification circuit.

FIG. 4 illustrates a verification circuit (which is itself an arithmetic circuit) 400.

The verification circuit 400 receives a public input ( $\mathcal{P}$ ) and a secret input (sk). The secret input (sk) can be any value that is not revealed to a verifier. For example, the secret input (sk) may be a private key. One example of a private key is a signing key such as an Elliptic Curve Digital Signature Algorithm (ECDSA) signing key. We refer to the input (sk) being "secret" in that it is not revealed to a verifier.

In particular, a function circuit 402 (which is itself an arithmetic circuit) representing a statement that a prover wants to prove, receives the secret input sk, and generates a function circuit output $\mathcal{P}$ (sk). Let any predicate $\mathcal{P}$ over an ECDSA signing key sk∈ $\mathbb{Z}_p$. The field $\mathbb{Z}_p$ are field elements {0, 1, 2, . . . , p–1} that are the remainders of a n modulo p operation whereby n is an integer and p is a prime number.

We assume that $\mathcal{P}$ can be expressed as a $\mathbb{Z}_p$-arithmetic circuit $\mathcal{C}$ 402. The function circuit 402 comprises a plurality of arithmetic gates that are connected by wires, and is capable of performing an arbitrarily complex computation. Each gate has two input wires and one output wire and performs either a multiplication (×) or addition (+) operation on the inputs.

An equality checking module 404 receives the public input ($\mathcal{P}$) and the function circuit output $\mathcal{P}$ (sk), and determines whether the public input ($\mathcal{P}$) corresponds to the function circuit output $\mathcal{P}$ (sk) to give a TRUE/FALSE result. The verification circuit 400 evaluates to TRUE if, and only if, $\mathcal{P} = \mathcal{P}$ (sk).

Thus given a public value $\mathcal{P}$, a party that claims $\mathcal{P} = \mathcal{P}$ (sk) but does not wish to reveal the secret input sk can generate a zero-knowledge argument to this statement using the verification circuit 400. In particular, a prover can prove statements like:

Statement 1: "P(sk) is the hash of sk under SHA256 function"

Statement 2: "P(sk) is the result of breaking sk into two subvectors of equal length, adding them up, and then apply the inner product with public vector v"

Any other statement that involves a predicate P that can be expressed as an arithmetic circuit.

With the verification circuit 400, the secret input sk must be an input wire to the verification circuit 400, but not necessarily a wire of a multiplicative gate—since it is desirable to consider arbitrary predicates $\mathcal{P}$ over the secret input sk. For example, to check if a given byte array $\mathcal{P}$ is the hash of the secret input sk under SHA-256, the predicate circuit $\mathcal{C}$ would be an arithmetic circuit over $\mathbb{Z}_p$ implementing the hash function.

Figure 5:
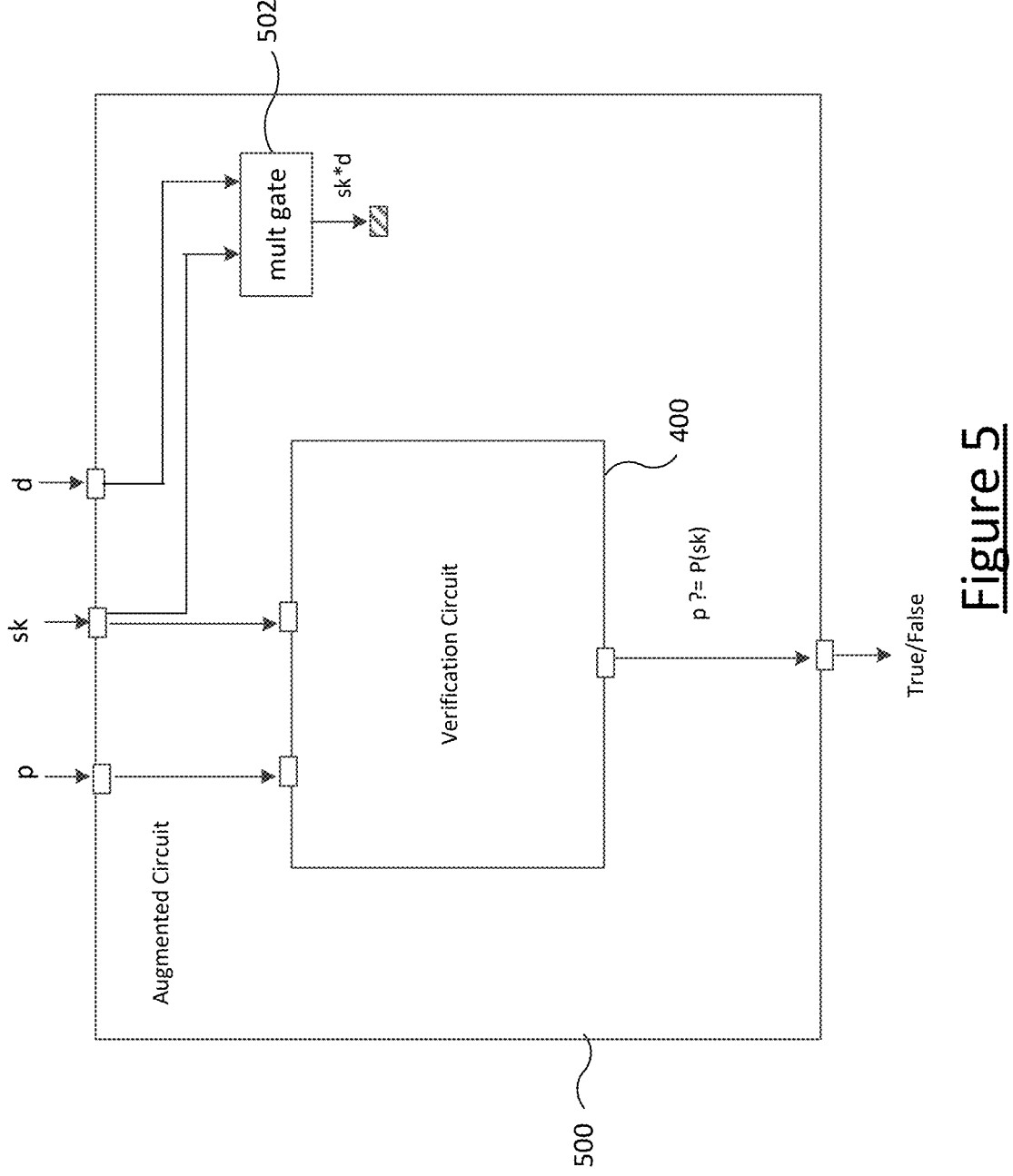
FIG. 5 is a schematic block diagram of an augmented verification circuit.

FIG. 5 illustrates an augmented verification circuit (which is itself an arithmetic circuit) 500.

The augmented verification circuit 500 comprises the verification circuit 400 and a dummy multiplicative gate 502. The dummy multiplicative gate 502 is arranged to receive the secret input sk and a dummy value (d). The dummy value (d) can take any value. As shown in FIG. 5, the output d*sk of the multiplicative gate 502 is not linked to the verification circuit 400 in any way nor does it provide an output of the augmented verification circuit 500. Within the verification circuit 400, an output of a multiplicative gate that is not an output of the augmented verification circuit 500 is referred to herein as an auxiliary variable.

The zkSNARK proof system gathers the inputs of all of the multiplicative gates of the augmented verification circuit 500 into a matrix $a_{j*}$ and commits to all of the columns of the matrix during the generation of a proof $\pi$. The use of the dummy multiplicative gate 502 (to which the secret input sk is supplied as an input) ensures that the secret input sk is gathered and is a component of this matrix $a_{j*}$ during the proof generation, thus ensuring that the prover commits to the secret input sk during proof generation.

A zkSNARK protocol generally consists of three phases:

a. Setup: Given the arithmetic circuit (e.g. the augmented verification circuit 500), a proving and verification key pair is computed. In the example of the Bootle and Bulletproof families of zk-SNARKs, the setup phase comprises generating a Pedersen commitment key in a verifiable way, and the Pedersen commitment key is used as both the proving key and the verification key b. Proof generation (a prover executes proof generation): Given the proving key, public components X of the arithmetic circuit (which includes public inputs to the arithmetic circuit, public outputs of the arithmetic circuit, and any public auxiliary variables) and secret components $\mathcal{W}$ of the arithmetic circuit (which includes secret inputs to the arithmetic circuit, and any secret auxiliary variables), the prover generates a proof $\pi$ and sends it to the verifier.

c. Verification (a verifier executes a verification protocol): The verifier receives the proof n. Given the verification key and the public components X of the arithmetic circuit (which includes public inputs to the arithmetic circuit, public outputs of the arithmetic circuit, and any public auxiliary variables), the verifier performs verification of the proof $\pi$.

Thus during the setup phase, given the augmented verification circuit 500, a proving key PrK and verification key VK is computed. The proving key PrK and the verification key VK can be the same (e.g. a common reference string) or they can be different to each other (depending on the type of zkSNARK).

Figure 6:
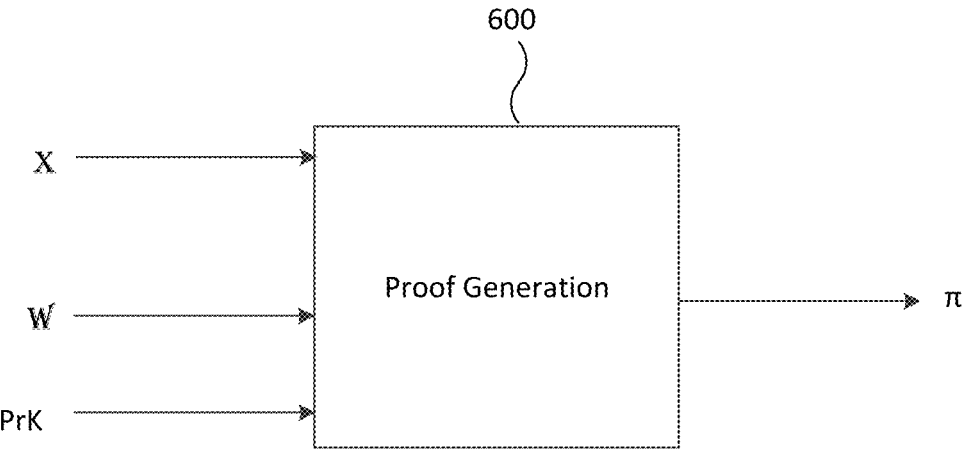
FIG. 6 illustrates inputs of a proof generation process.

FIG. 6 illustrates the inputs supplied into a proof generation process 600 performed by a proving computing device of a prover. For example, the prover may correspond to Alice 103a associated with a proving computing device 102a. As shown in FIG. 6, in order to provide proof that a statement (represented by the function circuit 402) is true while keeping the secret input sk a secret, the proving computing device 102a generates a zero knowledge proof using the public components X of the augmented verification circuit 500, the secret components X of the augmented verification circuit 500, and the proving key PrK which is linked to the augmented verification circuit 500, to generate the zero knowledge proof n.

The proving computing device 102a can then transmit the zero knowledge proof T to a verifying computing device to enable the verifying computing device to verify that the computing device has knowledge of the secret input.

The proving computing device 102a can transmit the statement to the verifying computing device. The statement may be transmitted with, or in a separate transmission to, the transmission of the zero knowledge proof $\pi$. In some implementations, the verifying computing device can obtain the statement by other means, and it is not necessary for the proving computing device 102a to transmit the statement to the verifying computing device.

In embodiments of the present invention, the zkSNARK proof system commits to inputs of multiplicative gates of the augmented verification circuit 500 using a Pedersen commitment scheme. Considering the augmented verification circuit 500 as a circuit $\mathcal{C}$ with N=mn multiplicative gates (where m and n are integers). For the i-th multiplicative gate, the left-input, right-input and output wires can be denotes with ($a_i$, $b_i$, $c_i$) respectively. All left-input wires can be arranged in a m×n matrix $\mathcal{M}_a$, with rows $a_i$, all right-input wires can be arranged in a matrix $\mathcal{M}_b$ with rows $b_i$, and all output wires can be arranged in a matrix $\mathcal{M}_c$ with rows $c_i$. We refer to i* below which is the index of the row $a_{i*}$ of the matrix $\mathcal{M}_a$.

In particular, the proof $\pi$ comprises a commitment $A_{i*}$ to the vector $a_{i*}$ (otherwise referred to herein as a first vector) using a commitment key CK and a random value r. This can be expressed as:

$$A_{i*} = Com(a_{i*}, CK; r),$$

$A_{i*}$ is a commitment to the i*-th row of matrix $\mathcal{M}_a$, which is part of the circuit satisfiability argument. The commitment $A_{i*}$ may be a point on an elliptic curve $\mathbb{C}$.

The vector $a_{i*}$ comprises 'n' components (where n is an integer) from a finite group of data elements (wherein n is an integer value). One of the n components in the vector $a_{i*}$ (at position j*) is the secret input sk which is a discrete logarithm of an element of the finite group of data elements. The finite group of data elements may be of an elliptic curve $\mathbb{C}$ For example, the secret input sk may be a signing key and the element referred to above may be a public key PK corresponding to the signing key (whereby the public key PK a point on an elliptic curve $\mathbb{C}$).

As noted above, the use of the dummy multiplicative gate 502 (to which the secret input sk is supplied as an input) ensures that the secret input sk is gathered and is a component of the vector $a_{i*}$ during the proof generation. The vector $a_{i*}$ is kept secret by the proving computing device (it is not shared with the verifying computing device).

The commitment key CK is also a vector comprising 'n' components (where n is an integer) from the finite group of data elements (having the same number of components as the vector $a_{i*}$). This can be expressed as:

$$CK = (G_0, G_1, \ldots, G_n) \in \mathbb{C}^{n+1}$$

where each $G_i$ is from the finite group of data elements e.g. a point in the elliptic curve $\mathbb{C}$.

As noted above, in the example of the Bootle and Bulletproof families of zk-SNARKs, the proving key and the verification key are the same, and they correspond to (i.e. are the same as) the commitment key CK.

Embodiments extend to other discrete-log based zero-knowledge proof schemes. Thus in dependence on the particular discrete-log based zero-knowledge proof scheme being used, the proving key and the verification key may be the same, but the commitment key CK may be different to the proving/verification key. In other implementations, the proving key and the verification key may be different to each other and also different to the commitment key CK.

One of the n components of the commitment key vector CK (at position j*) may be a base point of the elliptic curve $\mathbb{C}$ predetermined position which corresponds to the position j* in the first vector $a_{i*}$. The j*-th generator $G_{j*}$ of the commitment key CK may be the base point G of the ECDSA scheme. Put differently, it holds that the public key PK may be obtained by multiplying the j*-th generator $G_{j*}$ with the secret input sk. This can be expressed as:

$$PK = skG_{j*}.$$

More generally, an element of the finite group of data elements (not necessarily a public key PK) may be obtained by multiplying the j*-th generator $G_{j*}$ of the commitment key CK with the secret input which can be any integer in $\mathbb{Z}_p = \{0, 1, 2, \ldots, p-1\}$ (not necessarily a signing key).

The commitment key CK is public to both the proving computing device and the verifying computing device. Similarly, the public key PK is public to both the proving computing device and the verifying computing device.

The randomness $r \in \mathbb{Z}_p$ used to generate the commitment $A_{i*}$ is kept secret by the proving computing device (it is not shared with the verifying computing device).

Persons skilled in the art will appreciate that the steps involved in the proof generation process implemented by a proving computer equipment will depend on the particular type of ZKP being implemented and such steps are known to persons skilled in the art.

The third verification phase of the zkSNARK protocol returns an accept or reject decision depending on whether the proof is found to be valid or invalid, respectively.

Figure 7:
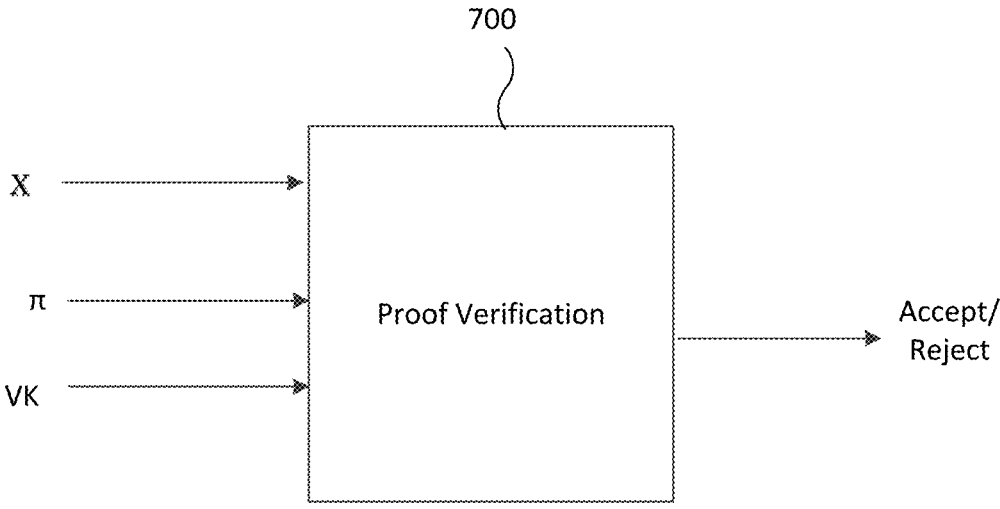
FIG. 7 illustrates inputs of a proof verification process.

FIG. 7 illustrates the inputs supplied into a proof verification process 700 performed by a verifying computing device of a verifier. For example, the verifier may correspond to Bob 103b associated with a verifying computing device 102b.

The verifying computing device 102b receives the zero knowledge proof $\pi$ from the proving computing device 102a. The verifying computing device 102b also obtains a statement. As shown in FIG. 7, in order to verify that the statement (represented by the function circuit 402) is true without knowledge of a secret input sk to the statement, the verifying computing device verifies that the zero knowledge proof $\pi$ is valid using the proof n, the public components X of the augmented verification circuit 500, and the verification key VK which is linked to the augmented verification circuit 500.

If the proof verification process 700 performed by the verifying computing device 102b returns an accept decision, the verifying computing device 102b determines that the proving computing device 102a has knowledge of the secret input without the secret input being revealed to the verifying computing device 102b.

Anyone with knowledge of this proof $\pi$ and the corresponding augmented verification circuit 500 can verify the calculation, making it a non-interactive proof. The verifier does not learn any information about the secret sk, and it is computationally infeasible for a proof to succeed without being correctly calculated i.e., it is computationally infeasible for a prover to calculate a proof that is accepted aside from acting honestly. The verification key VK will ensure the verifier that the pre-defined statement (represented by the function circuit 402) is indeed being validated without the verifier directly using the augmented verification circuit 500.

Similarly, persons skilled in the art will appreciate that the steps involved in the proof verification process implemented by a verifier computer equipment will depend on the particular type of ZKP being implemented and such steps are known to persons skilled in the art.

Thus, taking the example of Statement 1: "P(sk) is the hash of sk under SHA256 function", in accordance with embodiments of the present disclosure the prover can proving that they know the preimage (sk) for the given hash digest without revealing the preimage (sk).

Proving Consistency Between a Private Key and a Public Key In addition to proving a statement relating to the secret input sk, embodiments of the present disclosure extend to the proving computing device 102a proving that the secret input sk is a discrete logarithm of an element of the finite group of data elements, and the verifying computing device 102b verifying that the secret input sk that is committed in a batched commitment is a discrete logarithm of the element of the finite group of data elements (without knowledge of the secret input sk).

As explained above, the finite group of data elements may be of an elliptic curve $\mathbb{C}$. For example, the secret input sk may be a private key (such as a signing key) and t element referred to above may be a public key PK corresponding to the private key (whereby the public key PK is a point on an elliptic curve $\mathbb{C}$). Thus in one example, embodiments of the present disclosure extend to proving that a signing key sk corresponds to (i.e. is consistent with) a given public key PK that is public to both the proving computing device $102a$ and the verifying computing device $102b$, without revealing any information about the signing key sk to the verifying computing device $102b$.

In particular, the proving computing device $102a$ can prove that the signing key sk that is committed in the batched commitment $A_{j*}$ corresponds to the public key PK i.e. that the signing key sk is the discrete logarithm of the public key PK. This involves the proving computing device $102a$ proving that the first vector $a_{j*}$ contains at position $j*$ the signing key sk which corresponds to public key PK.

Thus, taking the example of Statement 1: "P(sk) is the hash of sk under SHA256 function", in addition to the prover proving that they know the preimage (sk) for the given hash digest without revealing the preimage (sk), the prover can additionally prove that the preimage (sk) that they know is precisely the signing key that corresponds to a known public key PK.

Figure 8:
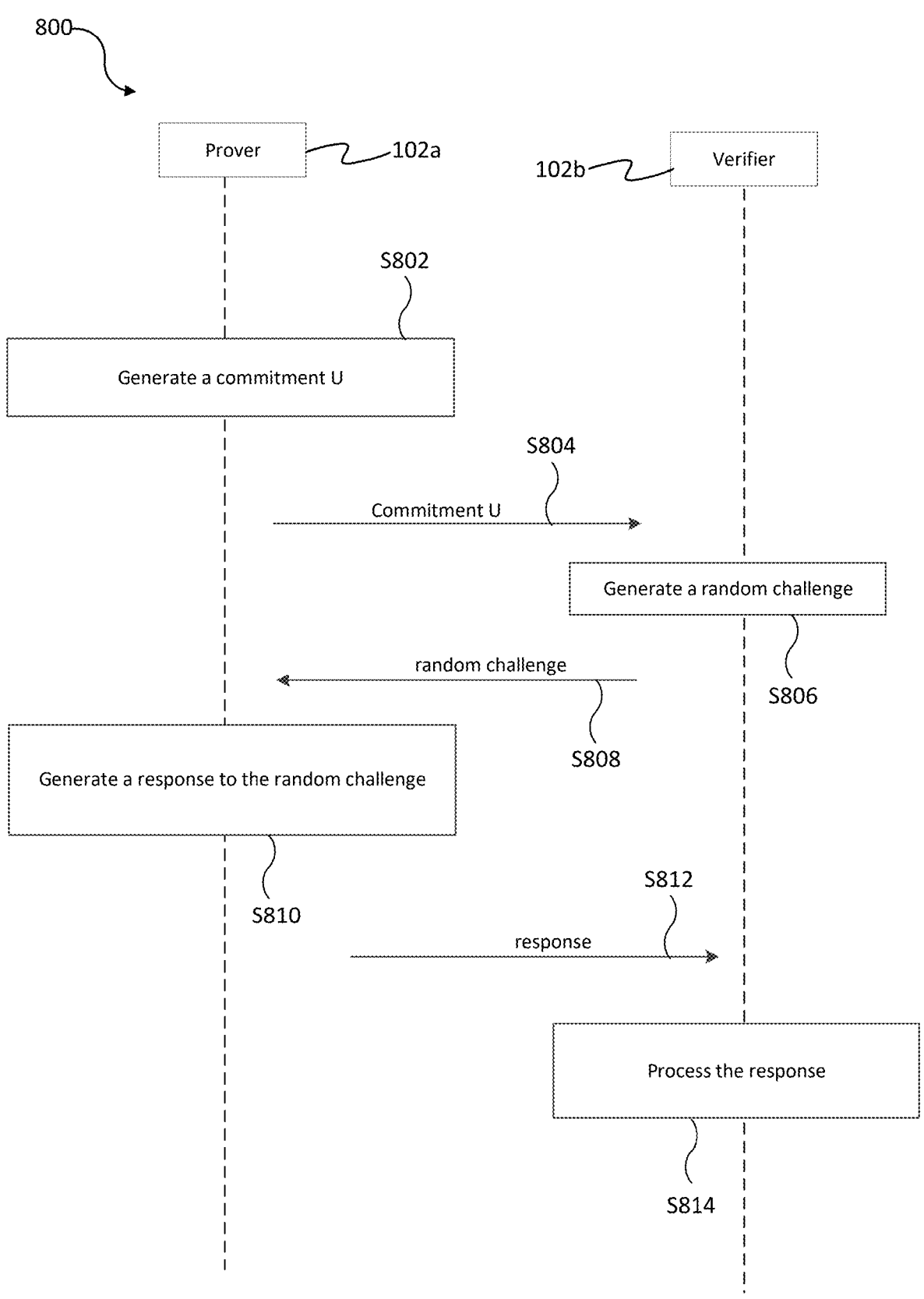
FIG. 8 illustrates a method of proving (and verifying) that a secret that is committed in a batched commitment is a discrete logarithm of a public element of a finite group of data elements.

We describe a method of proving that a signing key sk corresponds to (i.e. is consistent with) a given public key PK with reference to FIG. 8.

The method described with reference to FIG. 8 can be used in combination with the use of the augmented verification circuit 500 (which ensures that the batched commitment $A_{j*}$ sent to the verifying computing device $102b$ as part of the proof, is a commitment to a vector $a_{j*}$ comprising the signing key sk).

However, the method described with reference to FIG. 8 is not limited to implementations whereby the augmented verification circuit 500 is used. That is, the method described with reference to FIG. 8 can be used in combination with any other zkSNARK that generates a commitment to a vector $a_{j*}$ comprising the signing key sk and is not limited to the use of the Bootle and Bulletproof families of zk-SNARKs.

At step S802 the proving computing device $102a$ generates a further batched commitment U. In particular, in order to generate the further batched commitment U, the proving computing device $102a$ generates a random vector $u = (u_1, \ldots u_{n-1}) \in$ $$\mathbb{Z}_p^{n-1}.$$

The vector u comprises 'n' components where each of the 'n' components is a random integer value (the vector u having the same number of components as the vector $a_{j*}$). The proving computing device $102a$ then inserts a zero after position $j*-1$ in u. This results in a n-long vector ũ (also referred to herein as a second vector) with $ũ_{j*}=0$. That is, one of the 'n' components in the vector ũ (at position $j*$) is zero (where n is an integer).

In order to generate the further batched commitment U, the proving computing device $102a$ generates a random element $s \in \mathbb{Z}_p$. The randomness $s \in \mathbb{Z}_p$ used to generated the further batched commitment U is kept secret by the proving computing device (it is not shared with the verifying computing device).

The proving computing device $102a$ computes the further batched commitment U to vector ũ using the commitment key CK and the random value s. This can be expressed as:

$$U = Com(ũ, CK; s) = sG_0 + \sum\nolimits_{j=1}^{n} u_j G_j.$$

At step S804 the proving computing device $102a$ transmits the further batched commitment U to the verifying computing device $102b$.

At step S806, the verifying computing device $102b$, generates a random challenge $x \in \mathbb{Z}_p^*$ and at step S808, sends the random challenge x to the proving computing device $102a$.

At step S810, the proving computing device $102a$ generates a response to the random challenge x using the first vector $a_{j*}$, the second vector u and the random challenge x.

In particular, the proving computing device $102a$ modifies the first vector $a_{j*}$ by replacing the signing key sk at position $j*$ with a zero to generate a modified first vector ã where ã can be expressed as:

$$ã = (a_{j*,1}, \ldots a_{j*,j*-1}, 0, a_{j*,j*+1}, \ldots a_{j*,n}) \in \mathbb{Z}_p^n$$

The proving computing device $102a$ generates a response vector v comprising 'n' components by combining the modified first vector ã with the second vector ũ using the random challenge (the response vector v having the same number of components as the vector $a_{j*}$). In particular, the response vector v can be expressed as:

$$v := ũ + xã \in \mathbb{Z}_p^n$$

The proving computing device $102a$ also generates a combined random element t by combining the random value s with the random value r used to generated the commitment $A_{j*}$ In particular, the combined random element t can be expressed as:

$$t := r + s \in \mathbb{Z}_p$$

The response (v, t) generated by the proving computing device $102a$ at step S810 comprises the response vector v and the combined random element t.

At step S812, the proving computing device $102a$ transmits the response (v, t) to the verifying computing device $102b$ At step S814, the verifying computing device $102b$ verifies whether the secret input sk that is committed in a batched commitment is a discrete logarithm of the element of the finite group of data elements (without knowledge of the secret input sk) using the response (v, t), the batched commitment $A_{j*}$, the further batched commitment U, and the random challenge x. In the example of FIG. 8, the verifying computing device $102b$ verifies that the proving computing device $102a$ has knowledge of the signing key sk which corresponds to public key PK using the response (v, t), the batched commitment $A_{j*}$, the further batched commitment U, and the random challenge x. In particular, at step S814 the verifying computing device $102b$ checks the consistency between the public key PK and the commitment $A_{j*}$.

In order to do this, the verifying computing device $102b$ determines whether the component of the response vector v at position $j*$ is non-zero. If the verifying computing device $102b$ determines that the component of the response vector v at position $j*$ is non-zero then the verification that the proving computing device $102a$ has knowledge of the signing key sk which corresponds to public key PK fails.

If the verifying computing device 102*b* determines that the component of the response vector v at position j* is zero then a further check is performed.

In particular, the verifying computing device 102*b* computes a combined commitment A' using the batched commitment $A_{j*}$, the random challenge x, the further batched commitment U and the public key PK. In particular, the combined commitment A' can be expressed as:

$$A' = U + x(A_{j*} - PK) \in \mathbb{C}$$

The verifying computing device 102*b* verifies whether the proving computing device 102*a* has knowledge of the signing key sk which corresponds to public key PK using the response (v, t), the combined commitment A', and the commitment key CK. As is known to persons skilled in the art, verification of a Perdersen commitment comprises re-executing the commit algorithm with the provided randomness and checking that it outputs the same commitment.

If this verification is successful then the verifying computing device 102*b* determines the proving computing device 102*a* has knowledge of the signing key sk which corresponds to public key PK.

Whilst FIG. 8 has been described above with reference to the finite group of data elements being of an elliptic curve $\mathbb{C}$, this is merely an example. Furthermore whilst, FIG. 8 has been described above with reference the secret input sk being a signing key and the element of the finite group of data elements being a public key PK this is merely an example and the method 800 can be used to prove that any secret input sk committed in a batched commitment is a discrete logarithm of a public element of a finite group of data elements.

Embodiments of the present disclosure can have a number of different applications.

Application I

Examples of the invention, as described in the implementation sections above, can be applied to a ZKCP for an outsourced bitcoin vanity address, which represents data to be exchanged for a payment, or access to a resource.

Bitcoin addresses are encoded in a human readable alphanumeric format (Base58 encoding) in order to make them easy to publish, copy and transcribe. The use of this format has led to the popularity of so-called vanity addresses, where the key space is brute-force searched in order to find a private key that results an address that contains a desired string (like a name).

Since deriving a vanity address with a significant pattern can be computationally expensive (for example, the address shown above required the generation of approximately $10^{13}$ different public keys before a match was found) it is common for the search to be outsourced, and there are several online marketplaces where vanity addresses are commissioned and sold. This can be done securely using the homomorphic properties of elliptic curve point multiplication.

Although outsourcing the generation is secure, the sale of the vanity address is not trustless. Either the buyer gets the required value before the seller gets paid, or the seller gets paid before releasing the required value, or they must both trust an escrow service. The invention can be employed to enable the trustless sale of a vanity address via a ZKCP. The steps taken between the buyer/verifier and the seller/prover are described below.

1. The buyer and seller agree on the required vanity pattern (Str) and the price (a Bitcoin), and establish a communication channel, which does not need to be secure.
2. The buyer generates a secure random secret key $sk_B$ and corresponding elliptic curve public key, wherein the public key $pk_B=sk_B \times G$
3. The buyer sends $pk_B$ to the seller.
4. The seller then performs a search for the required pattern in the Base58 encoded address derived from $pk=pk_B+i \times G$ by changing i.
5. When an address with the required pattern is found, the seller saves the value i, signals to the buyer and sends them $pk_s=i \times G$ and the SHA256 hash H(i).
6. The seller also provides a proof to the buyer that the pre-image to H(i) is the private key corresponding to $pk_s$, using the techniques described herein.
7. The buyer verifies the proof, and also confirms that the address corresponding to $pk=pk_B+pk_s$ matches the agreed pattern. At this point (by virtue of the proof), the buyer knows that learning the value i will enable them derive the full private key for the vanity address $(sk_B+i)$, and that the particular value i hashes to h=H(i).
8. The buyer then constructs a hash-time-locked contract (HTLC) transaction $Tx_1$, which contains an output that contains the agreed fee (a). This output can be unlocked in in two ways:
 i. With a signature from the seller and the hash pre-image, i, at any time.
 ii. With a signature from the buyer after a specified time, using, for example, the CHECKLOCKTIMEVERIFY (OP_CLTV) script op code, which can be used to prevent an output from being spent until a specified time or block height.
9. The buyer then signs and broadcasts this transaction to the blockchain, where it is mined into a block.
10. Once confirmed, the seller can claim the fee in the output of $Tx_1$ by providing a transaction $Tx_2$ supplying their signature and the value i to unlock the hash-lock, which is then revealed on the blockchain.
11. The buyer can calculates the final vanity address private key $sk=sk_B+i$, where $pk=sk \times G$
12. If the buyer fails to supply the value i before a specified OP_CLTV time, then the seller can provide their signature to re-claim the fee (to prevent the fee being lost due to an un-cooperative buyer).

The transaction is then fully atomic and trustless: the buyer only gets paid if they provide a valid value i, which is revealed publically on the blockchain. Due to the splitting of the private key, this value is of no use to anyone else and does not compromise the security of the full private key.

Application II

Examples of the invention can also be applied to a private exchange of data between two parties, each having their respective data to be swapped registered on different blockchains.

More specifically, the invention can be applied to a privacy preserving cross-chain atomic swap, which is a trustless fair-exchange protocol that leverages blockchain transaction features also known as an atomic trade. The protocol is used to trade two different cryptocurrency tokens on two different blockchains without a third party centralised exchange. The word 'atomic' in this context refers to the fair exchange property: either the both parties complete their transactions or neither do.

An example of a known basic protocol is executed as per the steps below. To be secure, both of the cryptocurrencies used in the swap must have scripting functionality that enables hashed and time-locked contracts. The swap involves two parties: Alice and Bob. In this example, Alice has 1 Bitcoin and has agreed to trade it for Bob's 100 Litecoins.

1. Alice generates a Litecoin public key $P_A$, which she sends to Bob
2. Bob generates a Bitcoin public key $P_B$, which he sends to Alice
3. Alice generates a secure random number x
4. Alice computes the SHA-256 hash of x: $h=H(x)$
5. Alice creates a Bitcoin transaction $Tx_A$, which:
   i. Pays 1 Bitcoin to $P_B$ with a valid signature AND a value that hashes to h
   ii. OR pays 1 Bitcoin back to Alice after 24 hours.
6. Alice broadcasts the transaction to the Bitcoin network.
7. Once Bob observes $Tx_A$ is confirmed on the Bitcoin blockchain, he creates a Litecoin transaction $Tx_B$, which:
   i. Pays 100 Litecoin to $P_A$ with a valid signature AND a value that hashes to h ii. OR pays 100 Litecoin back to Bob after 24 hours.
8. Bob broadcasts the transaction to the Litecoin network.
9. Once the transaction has confirmed, Alice can then claim the Litecoin output by providing her signature and the value x.
10. Once Bob observes the value x on the Litecoin blockchain and can then claim the Bitcoin output by providing his signature and the value x.

This example ensures that either both parties get their coins, or neither do. Alice generates the hash value and only she knows the pre-image, but she is required to reveal this pre-image to claim the coins, which then enables Bob to claim his coins. If either party does not follow the protocol to completion, both of them can re-claim their coins after a lock-out period.

One significant disadvantage feature of the known protocol described above is that the transactions on both blockchains are trivially linkable: once confirmed, the unique value x is publically visible on both blockchains, forever. This affects both the fungibility of the coins and the privacy of the transaction.

In order to un-link the two transactions, different keys must be used for the outputs on each chain, but in order for the protocol to be secure and trustless, Bob must be given a proof by Alice that he will learn the information needed to unlock his coin when she reveals her hash pre-image.

By employing the key-statement proof described in the examples above, the hash-locked output on the second blockchain can be converted to a normal pay-to-public-key-hash (P2PKH) output, both disguising the nature of the transaction and breaking any possible link.

Applied to the example above in which Alice has 1 Bitcoin and has agreed to trade it for Bob's 100 Litecoins, the improved process would include the actions below:

1. Alice generates a Litecoin public key $P_A$ (with private key $S_A$), which she sends to Bob
2. Bob generates a Bitcoin public key $P_B$ (with private key $S_B$), which he sends to Alice
3. Alice generates a secure random number $x \leftarrow Z_p$ 4. Alice computes the SHA-256 hash of x: $h=H(x)$ and a the elliptic curve public key corresponding to x: $P_x=x \times G$
5. Alice securely sends both h and $P_x$ to Bob.
6. Alice also sends a key-statement proof to Bob that the pre-image of h is equal to the private key that generated $P_x$.
7. Alice creates a Bitcoin transaction $Tx_A$, which:
   i. Pays 1 Bitcoin to public key $P_C=P_B+P_x$
   ii. OR pays 1 Bitcoin back to Alice after 24 hours.
8. Alice broadcasts the transaction to the Bitcoin network.
9. Once Bob observes $Tx_A$ is confirmed on the Bitcoin blockchain, he creates a Litecoin transaction $Tx_B$, which:
   i. Pays 100 Litecoin to $P_A$ with a valid signature AND a value that SHA-256 hashes to h ii.
   OR pays 100 Litecoin back to Bob after 24 hours.
10. Bob broadcasts the transaction to the Litecoin network.
11. Once the transaction has confirmed, Alice can then claim the Litecoin output by providing her signature and the value x.
12. Once Bob observes the value x on the Litecoin blockchain and can then claim the Bitcoin output by providing a signature using the private key for $P_{c''}$ which is $s_B+x$ from the homomorphic properties of elliptic curve point multiplication.

Other Applications

The invention is suited to zero-knowledge proof or verification of a statement (S) in which a prover proves to a verifier that a statement is true while keeping a witness (w) to the statement a secret. The secret can be processed by a function, such as a hash function, but additionally include cryptographic elliptic curve key operations, for example the validity of statements regarding public keys. In an example above the method of the invention has been used to enable a trustless ZKCP for a vanity address. This can also be applied to, for example: the derivation of a password; the verification of a valid machine-readable document, such as a passport or identify card; or other such confidential transactions.

It should be noted that the above-mentioned embodiments illustrate rather than limit the invention, and that those skilled in the art will be capable of designing many alternative embodiments without departing from the scope of the invention as defined by the appended claims.

CONCLUSION

Other variants or use cases of the disclosed techniques may become apparent to the person skilled in the art once given the disclosure herein. The scope of the disclosure is not limited by the described embodiments but only by the accompanying claims.

Some embodiments above have been described in terms of a bitcoin network 106, bitcoin blockchain 150 and bitcoin nodes 104. However it will be appreciated that the bitcoin blockchain is one particular example of a blockchain 150 and the above description may apply generally to any blockchain. That is, the present invention is in by no way limited to the bitcoin blockchain. More generally, any reference above to bitcoin network 106, bitcoin blockchain 150 and bitcoin nodes 104 may be replaced with reference to a blockchain network 106, blockchain 150 and blockchain node 104 respectively. The blockchain, blockchain network and/or blockchain nodes may share some or all of the described properties of the bitcoin blockchain 150, bitcoin network 106 and bitcoin nodes 104 as described above.

In preferred embodiments of the invention, the blockchain network 106 is the bitcoin network and bitcoin nodes 104 perform at least all of the described functions of creating, publishing, propagating and storing blocks 151 of the blockchain 150. It is not excluded that there may be other network entities (or network elements) that only perform one or some but not all of these functions. That is, a network entity may perform the function of propagating and/or storing blocks without creating and publishing blocks (recall that these entities are not considered nodes of the preferred bitcoin network 106).

In other embodiments of the invention, the blockchain network 106 may not be the bitcoin network. In these embodiments, it is not excluded that a node may perform at least one or some but not all of the functions of creating, publishing, propagating and storing blocks 151 of the blockchain 150. For instance, on those other blockchain networks a "node" may be used to refer to a network entity that is configured to create and publish blocks 151 but not store and/or propagate those blocks 151 to other nodes.

Even more generally, any reference to the term "bitcoin node" 104 above may be replaced with the term "network entity" or "network element", wherein such an entity/element is configured to perform some or all of the roles of creating, publishing, propagating and storing blocks. The functions of such a network entity/element may be implemented in hardware in the same way described above with reference to a blockchain node 104.

It will be appreciated that the above embodiments have been described by way of example only. More generally there may be provided a method, apparatus or program in accordance with any one or more of the following Statements.

Aspects of the present disclosure are defined below with reference to the following clauses:

1. A computer implemented method of providing proof that a statement is true while keeping a secret input to the statement a secret, the method performed on a computing device and comprising:

generating a zero knowledge proof using a public input, the secret input, and a proving key linked to an augmented verification circuit, wherein the augmented verification circuit comprises (i) a verification circuit arranged to receive the public input and secret input, supply the secret input to a function circuit representing the statement to generate a function circuit output, and determine whether the public input corresponds to the function circuit output; and (ii) a multiplicative gate arranged to receive the secret input and a dummy value; and wherein the zero knowledge proof comprises a batched commitment to inputs of multiplicative gates of the augmented verification circuit, the batched commitment generated using a first vector comprising n components from a finite group of data elements, wherein the secret input is a discrete logarithm of a public element of said finite group of data elements; and transmitting the zero knowledge proof to a verifying computing device to enable the verifying computing device to verify that the computing device has knowledge of the secret input.

2. The computer-implemented method according to clause 1, wherein the batched commitment is a batched Pedersen commitment.

3. The computer-implemented method according to clause 1 or 2, wherein each of the n components of the first vector correspond to a respective input of the multiplicative gates of the arithmetic circuit and one of the n components of the first vector is at a position which corresponds to an input wire of the dummy multiplicative gate which is arranged to receive the secret input.

4. The computer-implemented method according to clause 3, wherein the finite group of data elements are of an elliptic curve.

5. The computer-implemented method according to clause 4, wherein the public element of said finite group of data elements is a public key and the secret input is a signing key.

6. The computer-implemented method according to any of clauses 3 to 5, wherein the method further comprises proving that the secret input is the discrete logarithm of the public element.

7. The computer-implemented method according to clause 6, wherein proving that the secret input is the discrete logarithm of the public element comprises:

generating a further batched commitment, and transmitting the further batched commitment to the verifying computing device;

receiving a random challenge from the verifying computing device;

generating a response to the random challenge, and transmitting the response to the verifying computing device to prove that the secret input is the discrete logarithm of the public element.

8. The computer-implemented method according to clause 7, wherein the further batched commitment is a batched Pedersen commitment.

9. The computer-implemented method according to clause 7 or 8, wherein generating the further batched commitment comprises:

generating a second vector comprising n components, wherein a component of the second vector at a predetermined position, corresponding to the position in the first vector, is set to zero; and generating the further batched commitment by committing to the second vector.

10. The computer-implemented method according to clause 9, wherein remaining components of the second vector are random values.

11. The computer-implemented method according to clause 9 or 10, wherein the finite group of data elements are of an elliptic curve, and generating the further batched commitment to the second vector uses a commitment key vector comprising n components from the finite group of data elements and one of the n components of the commitment key vector is a base point of the elliptic curve at a predetermined position which corresponds to the position in the first vector, the public element obtained by multiplying said base point with the secret input.

12. The computer-implemented method according to any of clauses 7 to 11, wherein in response to receiving the random challenge, the method comprises:

modifying the first vector by replacing the secret input at said position with a zero to generate a modified first vector;

wherein the response comprises a response vector generated by combining the modified first vector with the second vector using the random challenge; and transmitting the response to the verifying computing device.

13. The computer-implemented method according to clause 12, wherein the method further comprises combining a random element used to generate the batched commitment with a further random element of the further batched commitment to generate a combined random element, wherein the response comprises the combined random element.

14. A computer-implemented method according to any preceding clause, wherein the method comprises transmitting the statement to the verifying computing device.

15. A computer implemented method of verifying that a statement is true without knowledge of a secret input to the statement, the method performed on a computing device and comprising:

receiving a zero knowledge proof from a proving computing device;

obtaining the statement;

verifying that the zero knowledge proof is valid using the zero knowledge proof, a public input and a verification key linked to an augmented verification circuit, wherein the augmented verification circuit comprises (i) a verification circuit arranged to receive the public input and secret input, supply the secret input to a function circuit representing the statement to generate a function circuit output, and determine whether the public input corresponds to the function circuit output; and (ii) a multiplicative gate arranged to receive the secret input and a dummy value; and wherein the zero knowledge proof comprises a batched commitment to inputs of multiplicative gates of the augmented verification circuit, the batched commitment generated using a first vector comprising n components from a finite group of data elements, wherein the secret input is a discrete logarithm of a public element of said finite group of data elements; and determining that the proving computing device has knowledge of the secret input based on said verifying.

16. The computer-implemented method according to clause 15, wherein the batched commitment is a batched Pedersen commitment.

17. The computer-implemented method according to clause 15 or 16, wherein each of the n components of the first vector correspond to a respective input of the multiplicative gates of the arithmetic circuit and one of the n components of the first vector is at a position which corresponds to an input wire of the dummy multiplicative gate which is arranged to receive the secret input.

18. The computer-implemented method according to clause 17, wherein the finite group of data elements are of an elliptic curve.

19. The computer-implemented method according to clause 18, wherein the public element of said finite group of data elements is a public key and the secret input is a signing key.

20. The computer-implemented method according to any of clauses 17 to 19, wherein the method further comprises verifying that the secret input is the discrete logarithm of the public element, without knowledge of the secret input.

21. The computer-implemented method according to clause 20, wherein verifying that the secret input is the discrete logarithm of the public element comprises: receiving a further batched commitment from the proving computing device; in response to receiving the further batched commitment generating a random challenge and transmitting the random challenge to the proving computing device;

receiving a response to the random challenge from the proving computing device; and processing the response to verify that the secret input is the discrete logarithm of the public element.

22. The computer-implemented method according to clause 21, wherein the further batched commitment is a batched Pedersen commitment.

23. The computer-implemented method according to clause 21 or 22, wherein the further batched commitment is a commitment to a second vector comprising n components, wherein a component of the second vector, at a predetermined position corresponding to the position in the first vector, is set to zero.

24. The computer-implemented method according to clause 23, wherein remaining components of the second vector are random values.

25. The computer-implemented method according to any of clauses 21 to 24, wherein the response comprises a response vector that is a combination of a modified first vector and the second vector using the random challenge, the modified first vector corresponding to the first vector wherein the secret input at said position has been replaced with a zero.

26. The computer-implemented method according to clause 25, wherein the response vector comprises a plurality of components, and said processing comprises verifying that a component of the plurality of components of the response vector, at a predetermined position which corresponds to the position in the first vector, is non-zero.

27. The computer-implemented method according to any of clauses 21 to 26, wherein the finite group of data elements are of an elliptic curve, and said processing comprises:

computing a combined commitment using the batched commitment, the random challenge, the further batched commitment and the public element; and verifying that the secret input is the discrete logarithm of the public element using the response, the combined commitment, and a commitment key vector, wherein the commitment key vector comprises n components from the finite group of data elements and one of the n components of the commitment key vector is a base point of the elliptic curve at a predetermined position which corresponds to the position in the first vector, the public element obtained by multiplying said base point with the secret input.

28. A computer-implemented method according to any of clauses 15 to 27, wherein the method comprises receiving the statement from the verifying computing device.

29. The computer-implemented method according to any preceding clause, wherein an output of the multiplicative gate is not linked to the verification circuit.

30. A computer-implemented method according to any preceding clause, wherein the function circuit implements a hash function and, preferably, an SHA-256 hash function.

31. A computer program that, when read by a computing device, causes the computing device to perform the method of any preceding clause.

32. A non-transitory computer readable storage medium comprising computer readable instructions that, when read by a computing device, cause the computing device to perform the method of any of clauses 1 to 30.

33. A computing device comprising a processor and memory, the memory storing instructions which, when executed by the processor cause the computing device to perform the method of any of clauses 1 to 30.

The instructions may be provided on one or more carriers. For example there may be one or more non-transient memories, e.g. a EEPROM (e.g. a flash memory) a disk, CD- or DVD-ROM, programmed memory such as read-only memory (e.g. for Firmware), one or more transient memories (e.g. RAM), and/or a data carrier(s) such as an optical or electrical signal carrier. The memory/memories may be integrated into a corresponding processing chip and/or separate to the chip. Code (and/or data) to implement embodiments of the present disclosure may comprise source, object or executable code in a conventional programming language (interpreted or compiled) such as C, or assembly code, code for setting up or controlling an ASIC (Application Specific Integrated Circuit) or FPGA (Field Programmable Gate Array), or code for a hardware description language.

The invention claimed is:

1. A computer implemented method of providing proof that a statement is true while keeping a secret input to the statement a secret, the method performed on a computing device and comprising:
   generating a zero knowledge proof using a public input, the secret input, and a proving key linked to an augmented verification circuit,
   wherein the augmented verification circuit comprises (i) a verification circuit arranged to receive the public input and secret input, supply the secret input to a function circuit representing the statement to generate a function circuit output, and determine whether the public input corresponds to the function circuit output; and (ii) a multiplicative gate arranged to receive the secret input and a dummy value; and
   wherein the zero knowledge proof comprises a batched commitment to inputs of multiplicative gates of the augmented verification circuit, the batched commitment generated using a first vector comprising n components from a finite group of data elements, wherein each of the n components of the first vector correspond to a respective input of the multiplicative gates of the augmented verification circuit and one of the n components of the first vector is at a position which corresponds to an input wire of the dummy multiplicative gate which is arranged to receive the secret input, and wherein the secret input is a discrete logarithm of a public element of said finite group of data elements; and
   transmitting the zero knowledge proof to a verifying computing device to enable the verifying computing device to verify that the computing device has knowledge of the secret input.

2. The computer implemented method of claim 1, wherein the batched commitment is a batched Pedersen commitment.

3. The computer implemented method of claim 1, wherein the finite group of data elements are of an elliptic curve.

4. The computer implemented method of claim 3, wherein the public element of said finite group of data elements is a public key and the secret input is a signing key.

5. The computer implemented method of claim 1, wherein the method further comprises proving that the secret input is the discrete logarithm of the public element.

6. The computer implemented method of claim 5, wherein proving that the secret input is the discrete logarithm of the public element comprises:
   generating a further batched commitment, and transmitting the further batched commitment to the verifying computing device;
   receiving a random challenge from the verifying computing device;

generating a response to the random challenge, and transmitting the response to the verifying computing device to prove that the secret input is the discrete logarithm of the public element.

7. The computer implemented method of claim 6, wherein the further batched commitment is a batched Pedersen commitment.

8. The computer implemented method of claim 6, wherein generating the further batched commitment comprises:
   generating a second vector comprising n components, wherein a component of the second vector at a predetermined position, corresponding to the position in the first vector, is set to zero; and
   generating the further batched commitment by committing to the second vector.

9. The computer implemented method of claim 8, wherein remaining components of the second vector are random values.

10. The computer implemented method of claim 8, wherein the finite group of data elements are of an elliptic curve, and generating the further batched commitment to the second vector uses a commitment key vector comprising n components from the finite group of data elements and one of the n components of the commitment key vector is a base point of the elliptic curve at a predetermined position which corresponds to the position in the first vector, the public element obtained by multiplying said base point with the secret input.

11. The computer implemented method of claim 8, wherein in response to receiving the random challenge, the method comprises:
   modifying the first vector by replacing the secret input at said position with a zero to generate a modified first vector;
   wherein the response comprises a response vector generated by combining the modified first vector with the second vector using the random challenge; and
   transmitting the response to the verifying computing device.

12. The computer implemented method of claim 11, wherein the method further comprises combining a random element used to generate the batched commitment with a further random element of the further batched commitment to generate a combined random element, wherein the response comprises the combined random element.

13. The computer implemented method of claim 1, wherein the method comprises transmitting the statement to the verifying computing device.

14. A computer implemented method of verifying that a statement is true without knowledge of a secret input to the statement, the method performed on a computing device and comprising:
   receiving a zero knowledge proof from a proving computing device;
   obtaining the statement;
   verifying that the zero knowledge proof is valid using the zero knowledge proof, a public input and a verification key linked to an augmented verification circuit,
   wherein the augmented verification circuit comprises (i) a verification circuit arranged to receive the public input and secret input, supply the secret input to a function circuit representing the statement to generate a function circuit output, and determine whether the public input corresponds to the function circuit output; and (ii) a multiplicative gate arranged to receive the secret input and a dummy value; and wherein the zero knowledge proof comprises a batched commitment to inputs of multiplicative gates of the augmented verification circuit, the batched commitment generated using a first vector comprising n components from a finite group of data elements, wherein each of the n components of the first vector correspond to a respective input of the multiplicative gates of the augmented verification circuit and one of the n components of the first vector is at a position which corresponds to an input wire of the dummy multiplicative gate which is arranged to receive the secret input, and wherein the secret input is a discrete logarithm of a public element of said finite group of data elements; and determining that the proving computing device has knowledge of the secret input based on said verifying.

15. The computer implemented method of claim 1, wherein an output of the multiplicative gate is not linked to the verification circuit.

16. The computer implemented method of claim 1, wherein the function circuit implements a hash function and, preferably, an SHA-256 hash function.

17. A non-transitory computer readable storage medium comprising computer readable instructions that, when read by a computing device, cause the computing device to perform a method of providing proof that a statement is true while keeping a secret input to the statement a secret, the method performed on a computing device and comprising:

generating a zero knowledge proof using a public input, the secret input, and a proving key linked to an augmented verification circuit, wherein the augmented verification circuit comprises (i) a verification circuit arranged to receive the public input and secret input, supply the secret input to a function circuit representing the statement to generate a function circuit output, and determine whether the public input corresponds to the function circuit output; and (ii) a multiplicative gate arranged to receive the secret input and a dummy value; and wherein the zero knowledge proof comprises a batched commitment to inputs of multiplicative gates of the augmented verification circuit, the batched commitment generated using a first vector comprising n components from a finite group of data elements, wherein each of the n components of the first vector correspond to a respective input of the multiplicative gates of the augmented verification circuit and one of the n components of the first vector is at a position which corresponds to an input wire of the dummy multiplicative gate which is arranged to receive the secret input, and wherein the secret input is a discrete logarithm of a public element of said finite group of data elements; and transmitting the zero knowledge proof to a verifying computing device to enable the verifying computing device to verify that the computing device has knowledge of the secret input.

18. A computing device comprising a processor and memory, the memory storing instructions that, when executed by the processor cause the computing device to perform a method of providing proof that a statement is true while keeping a secret input to the statement a secret, the method performed on a computing device and comprising:

generating a zero knowledge proof using a public input, the secret input, and a proving key linked to an augmented verification circuit, wherein the augmented verification circuit comprises (i) a verification circuit arranged to receive the public input and secret input, supply the secret input to a function circuit representing the statement to generate a function circuit output, and determine whether the public input corresponds to the function circuit output; and (ii) a multiplicative gate arranged to receive the secret input and a dummy value; and wherein the zero knowledge proof comprises a batched commitment to inputs of multiplicative gates of the augmented verification circuit, the batched commitment generated using a first vector comprising n components from a finite group of data elements, wherein each of the n components of the first vector correspond to a respective input of the multiplicative gates of the augmented verification circuit and one of the n components of the first vector is at a position which corresponds to an input wire of the dummy multiplicative gate which is arranged to receive the secret input, and wherein the secret input is a discrete logarithm of a public element of said finite group of data elements; and transmitting the zero knowledge proof to a verifying computing device to enable the verifying computing device to verify that the computing device has knowledge of the secret input.

* * * * *